(12) United States Patent
Rochette et al.

(10) Patent No.: US 7,757,291 B2
(45) Date of Patent: Jul. 13, 2010

(54) MALWARE CONTAINMENT BY APPLICATION ENCAPSULATION

(75) Inventors: Donn Rochette, Fenton, IA (US); Alois Liebl, New York, NY (US)

(73) Assignee: Trigence Corp., Ottawa, Ontario (CA)

( * ) Notice: Subject to any disclaimer, the term of this patent is extended or adjusted under 35 U.S.C. 154(b) by 1097 days.

(21) Appl. No.: 11/432,843

(22) Filed: May 12, 2006

(65) Prior Publication Data

US 2006/0265761 A1 Nov. 23, 2006

Related U.S. Application Data

(63) Continuation-in-part of application No. 11/415,028, filed on May 1, 2006, which is a continuation-in-part of application No. 11/380,285, filed on Apr. 26, 2006, which is a continuation-in-part of application No. 10/946,536, filed on Sep. 21, 2004, which is a continuation-in-part of application No. 10/939,903, filed on Sep. 13, 2004, now Pat. No. 7,519,814.

(60) Provisional application No. 60/678,721, filed on May 6, 2005, provisional application No. 60/676,998, filed on May 2, 2005, provisional application No. 60/504,213, filed on Sep. 22, 2003, provisional application No. 60/502,619, filed on Sep. 15, 2003, provisional application No. 60/512,103, filed on Oct. 20, 2003, provisional application No. 60/680,640, filed on May 13, 2005.

(51) Int. Cl.
*G06F 12/14* (2006.01)
(52) U.S. Cl. ............................. 726/24; 726/22; 713/164
(58) Field of Classification Search .................. 713/164
See application file for complete search history.

(56) References Cited

U.S. PATENT DOCUMENTS 5,859,966 A * 1/1999 Hayman et al. ................ 726/23

(Continued)

FOREIGN PATENT DOCUMENTS

WO    WO 02/06941 A    1/2002

(Continued)

*Primary Examiner*—Matthew B Smithers
(74) *Attorney, Agent, or Firm*—Allen, Dyer, Doppelt, Milbrath & Gilchrist, P.A.

(57) ABSTRACT

The invention discloses a method and system for protecting a computer platform from malware. The protection is achieved by encapsulating an application that can serve as a malware conduit within a protected capsule environment, so as to prevent the conduit application or any processes originated therefrom from accessing and making changes to objects associated with an operating system (OS) of the computer platform or with other applications running on the computer platform outside of the capsule environment, thereby preventing the malware provided via the conduit application from contaminating the computer platform outside of said secure protected environment, or capsule. Capsule runtime software manages the dynamic state of the encapsulated application, and re-directs system service requests generated by the application and associated processes from OS-provided system objects to corresponding object libraries provided within the capsule object set, so that any malware induced changes remain local to the capsule. Protection of the operating system and most applications running on the computer platform is thus provided by the isolation of the conduit applications within a secure capsule environment, which can be safely removed from the computer platform, together with any changes introduced by the malware to the computer platform, without affecting the computer operation.

20 Claims, 11 Drawing Sheets

U.S. PATENT DOCUMENTS

| | | | |
|---|---|---|---|
| 6,663,000 B1 | 12/2003 | Muttik et al. | 235/375 |
| 6,772,345 B1 | 8/2004 | Shetty | 726/24 |
| 7,213,247 B1 * | 5/2007 | Wilner et al. | 718/100 |
| 7,373,519 B1 * | 5/2008 | Nachenberg et al. | 713/187 |
| 7,484,247 B2 * | 1/2009 | Rozman et al. | 726/34 |
| 2002/0004854 A1 | 1/2002 | Hartley | |
| 2002/0174215 A1 | 11/2002 | Schaefer | 709/224 |
| 2003/0101292 A1 | 5/2003 | Fisher | |
| 2006/0031940 A1 | 2/2006 | Rozman et al. | 726/27 |
| 2006/0075501 A1 | 4/2006 | Thomas et al. | 726/24 |
| 2006/0085685 A1 | 4/2006 | Cheston et al. | 714/38 |

FOREIGN PATENT DOCUMENTS

WO    WO 2006/039181 A    4/2006

\* cited by examiner

MALWARE CONTAINMENT BY APPLICATION ENCAPSULATION

CROSS-REFERENCE TO RELATED APPLICATIONS

This application is a continuation-in-part of U.S. patent application Ser. No. 11/415,028 filed May 1, 2006, which claims priority from U.S. patent application No. 60/678,721 filed May 6, 2005 and which is a continuation-in-part of U.S. patent application Ser. No. 11/380,285 filed Apr. 26, 2006, which claims priority from U.S. patent application No. 60/676,998 filed May 2, 2005 and which is a continuation-in-part of U.S. patent application Ser. No. 10/946,536, filed Sep. 21, 2004, which claims priority from U.S. patent application No. 60/504,213 filed Sep. 22, 2003; it is also a continuation-in-part of U.S. patent application Ser. No. 10/939,903 filed Sep. 13, 2004 now U.S. Pat. No. 7,519,814, which claims priority from U.S. patent application No. 60/502,619 filed Sep. 15, 2003 and from U.S. patent application No. 60/512,103 filed Oct. 20, 2003, which are all incorporated herein by reference for all purposes.

The instant application also claims priority from U.S. patent application No. 60/680,640 filed May 13, 2005, which is incorporated herein by reference for all purposes.

FIELD OF THE INVENTION

The invention generally relates to computer software, and in particular to controlling the spread and impact of malicious software within a computer platform.

BACKGROUND OF THE INVENTION

Malware is a general term used for software that infiltrates a computer, commonly without obtaining the owner's consent, and performs adverse operations, such as collection of personal information, advertisement, configuration change, download and execution of other programs. Malware is commonly understood to include spyware, adware, computer viruses, and Trojans. Sometimes malware is also referred to as pestware or a computer contaminant.

By way of example, FIG. 1 illustrates a process of infecting a computer by malware via an application program 110, such as an internet browser 110 that is used to access a web server 120 through a network 130. During a normal mode of operation of the internet browser 110, scripts and small programs are downloaded and executed for legitimate reasons, e.g. to enable animation and other features used to create compelling web sites. However, these scripts and small programs can also become delivery mechanisms for malware 140. Once installed on the computer platform, malware code may corrupt specific files and settings 150 to render them unusable or to support malicious activities, such as tracking of Internet usage, display of unwanted advertising, and intercepting of personal information. It has to be noted that the application 110 may be an application other than an internet browser. Other applications connected to the network, such as e.g. an email client, can potentially conduct malware to a computer platform. The application 110 providing malware to the system can itself be corrupted by malware the same way as other applications.

The growth of distributed computing environments, particularly TCP/IP environments, has created an increased need for computer security, especially for protecting an operating system, application software, and stored data. According to a study performed by the National Cyber-Security Alliance malware may have affected 90% of home computers, making malware a major issue in the computer world.

A number of methods and systems for preventing or lessening the negative effects of malware are known in the art.

One group of anti-malware tools includes software intended to detect the effects of malware by searching files currently present or being introduced to a computer environment for a match with a known malware definition. For example, U.S. Pat. No. 6,663,000 issued to Muttik et al. on Dec. 16, 2003 discloses malware scanner containing a malware scanner engine, an updater, and malware definition data, wherein different components of the scanner validate each other.

In another example, U.S. Pat. No. 6,772,345 issued on Aug. 3, 2004, attempts to filter malware before it infects a platform. It describes a method of detecting malware that comprises the steps of: a) receiving a data stream, b) scanning the data stream at a protocol level to detect malware, c) removing the detected malware from the data stream, and d) transmitting the data stream without the malware.

This approach has limitations due primarily to the changing nature of the malware, which requires a high degree of diligence continually monitoring the ways in which malware is delivered. An inherent disadvantage of the disclosed methods is a delayed response caused by the time needed for malicious activities to be reported, analyzed by experts, and software updates with new malware definitions are prepared by experts and finally installed by users.

Another group includes methods and software tools for automatic recognition of suspicious activities. For example, US Pat. Application No. 20060075501 by Thomas et al teaches a system that comprises a heuristics engine and a number of shields designed to monitor for pestware and for typical pestware activity, e.g. key-logging. The shields report any suspicious activity to the heuristics engine. If the same activity is reported repeatedly, that activity can be automatically blocked or automatically permitted—depending upon the user's preference. The heuristics engine can also present the user with the option to block or allow an activity.

A fundamental problem with such methods is that initially malware is allowed to infect a computer platform and only after the malware has already been installed, an attempt is made to recognize and remove it. FIG. 2 illustrates current approaches to malware containment. An application 250, e.g. an Internet browser, is connected to a network, its interaction with the computer platform is filtered as shown in step 260. If a potential malicious activity is detected, a decision 270 is made if the operation should continue 220 or abort 230. The decision 270 is either pre-configured or the user is prompted for an input. If no malicious activity is suspected by the filter 260, the application operates in a regular way as shown by arrow 240, with no additional user interaction.

Additionally to the inherent delayed response discussed above, another disadvantage of this approach is that an ultimate decision on allowance of suspicious software activity, the decision either pre-configured or made at a prompt, is provided by the user who is not always competent enough and may not know the full extent of activities of the software in question. The decision is never made with 100% confidence, and a possible error causes either aborting the useful operation or infecting the computer platform.

Methods and tools of yet another group are designed to avoid or at least lessen effects of malicious activities generally without detecting presence of malware. US Patent Application 20060031940 by Rozman et al. teaches a system having a first memory space and a second memory space, wherein applications not connected to a network are allowed to access both the first and second memory spaces, while applications connected to the network are allowed to access only the second memory space, thus making the first memory space protected from malware delivered by the network-connected applications. This method may however require modifications to the applications and/or architectural or hardware changes to the system used to host those apps.

US Pat. Application 20060085685 by Cheston et al. discloses a method for computer system rejuvenation, wherein an image is created of the primary drive and stored in a second nonvolatile storage area. When the computer system becomes sluggish, the primary drive is reformatted and the image is copied from the second nonvolatile storage area to the primary drive. User data files and application and operating system settings are copied into the nonvolatile storage area and restored on the primary drive after the rejuvenation. Any malware stored on the computer system is wiped off when the computer system is periodically restored. A disadvantage of this method relates to disruption of computer's availability and possible loss of data and changes to the system not properly saved and documented.

It is an object of this invention to provide a method for protection of a computer system against malware effects which is not-disruptive to the system operation and does not rely on user expertise.

SUMMARY OF THE INVENTION

In accordance with the invention, a method is provided for isolating effects of malware within a contained capsule environment on a computer platform, wherein the computer platform is for executing a first software application and second software applications and includes a processor and an operating system (OS), wherein the OS includes a kernel residing on the computer platform and supporting the first and second software applications and a set of associated system objects included within an OS-defined system object namespace, when said malware is loaded via the first software application onto the computer platform, the method comprising the steps of: a) providing within the capsule environment an application-specific capsule object namespace that is distinct from the OS-defined system object namespace and accessible by the first software application and processes originated therefrom, b) providing a capsule object set in the application-specific capsule object namespace, the capsule object set including:

i) a set of associated capsule-related system objects for use by the first software application and any process originated therefrom in place of at least some of the associated system objects that are resident on the computer platform as part of the OS and are required for execution of the first software application, wherein said set of associated capsule-related system objects is not for use by the second software applications, and ii) capsule runtime software for managing a dynamic state and file location of the first software application, the capsule runtime software including at least one additional application library resident in user mode.

The method further includes providing a kernel module for supporting the capsule runtime software in kernel mode, wherein in operation the first software application and the second software applications utilize services of the same OS kernel residing on the computer platform. The capsule runtime software provides system-service filters for dynamically filtering system service requests generated by the first software application or by a process originated therefrom for one or more application related system objects required by the first software application, and for providing in response to said requests one or more corresponding application related system objects from the set of associated capsule-related system objects from the protected capsule-related object namespace, so as to contain malware-related system object changes and objects created by the first application, or any process originated therefrom, within the protected capsule object namespace, and to prevent the malware from changing system objects of the operating system.

In accordance with another aspect of the invention, the capsule run-time software is for managing configuration requests generated by the first software application and any process originated therefrom, wherein the system-service filters provided by the capsule run-time software are for re-directing configuration requests generated by the first software application and by any process originated therefrom from an OS configuration object to a capsule configuration object, that may include copying an OS configuration object to the capsule object namespace if the configuration request is for modifying the configuration object, so as to prevent the malware from changing configuration values of the OS configuration object.

In accordance with another aspect of the invention, the method of the present invention includes a step of replacing the application capsule when the first application is deemed to may have been compromised by malware, with a default application capsule known to be free of malware, to restore the first application and the computer platform in a state not compromised by the malware.

Another aspect of the invention provides a system for isolating effects of malware within a contained environment of a computer platform, wherein the computer platform is for executing a first software application and second software applications, and includes a processor, an OS including a kernel residing on the computer platform, and a set of associated system objects included within an OS-defined system object namespace, and wherein each of said first and second software applications includes an object executable by an operating system for performing a task related to a service, when said malware can be loaded via the first software application onto the computer platform. According to this aspect of the invention, the system comprises an application capsule for executing the first application therein, the application capsule having a capsule object namespace distinct from the OS-defined system object namespace and accessible by the first software application and processes originated therefrom and not by the second applications. The application capsule comprises a capsule object set, which in turn comprises:

I) application objects associated with and including the first software application, II) a set of capsule-related system objects required for execution of the first software application within the capsule environment, wherein in operation said capsule-related system objects are used by the first software application and any process originated therefrom in place of at least some of the associated system objects that are resident on the computer platform as part of the operating system and are not for use by the second software applications, and III) capsule runtime software for managing a dynamic state and file locations of the first software application, the capsule runtime software including at least one application filter library accessible by the first application.

The system further comprises a kernel module external to the capsule for supporting the capsule runtime software in kernel mode. In operation the first software application and the second software applications utilize services of the same OS kernel residing on the computer platform. The capsule runtime software provides system-service filters for dynamically filtering system service requests generated by the first software application or by a process originated therefrom for one or more associated system objects required by the first software application from the OS-defined object namespace, and provides in response to said requests one or more corresponding application related system objects from the set of capsule-related system objects from the capsule-related object namespace, so as to contain malware-related system object changes and objects created by the first application or any process originated therefrom within the capsule object namespace, and to prevent the malware from changing system objects of the operating system and objects associated with the second applications.

BRIEF DESCRIPTION OF THE DRAWINGS

Exemplary embodiments will now be described in conjunction with the drawings, in which.

DETAILED DESCRIPTION

Figure 1:
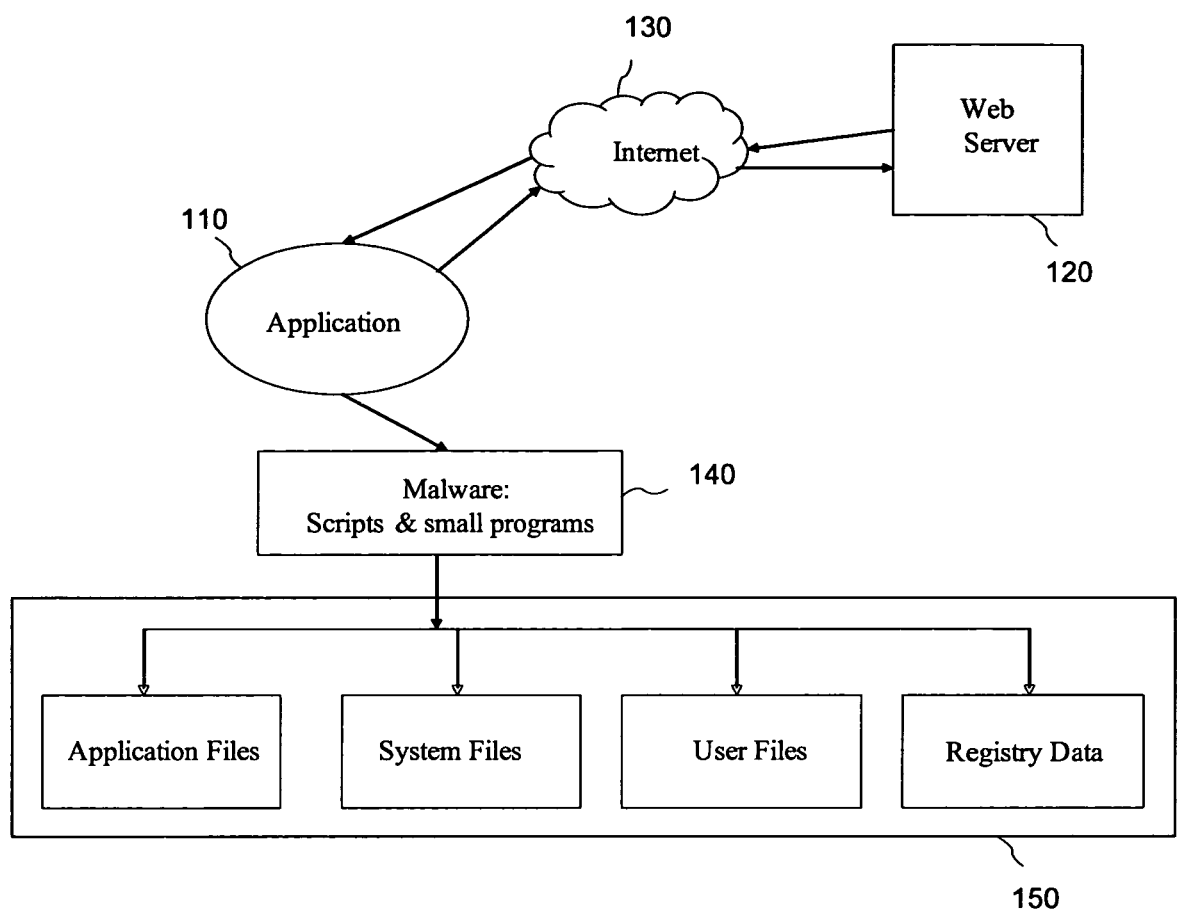
FIG. 1 is a block diagram depicting how malware infects a prior art computer platform.
Figure 2:
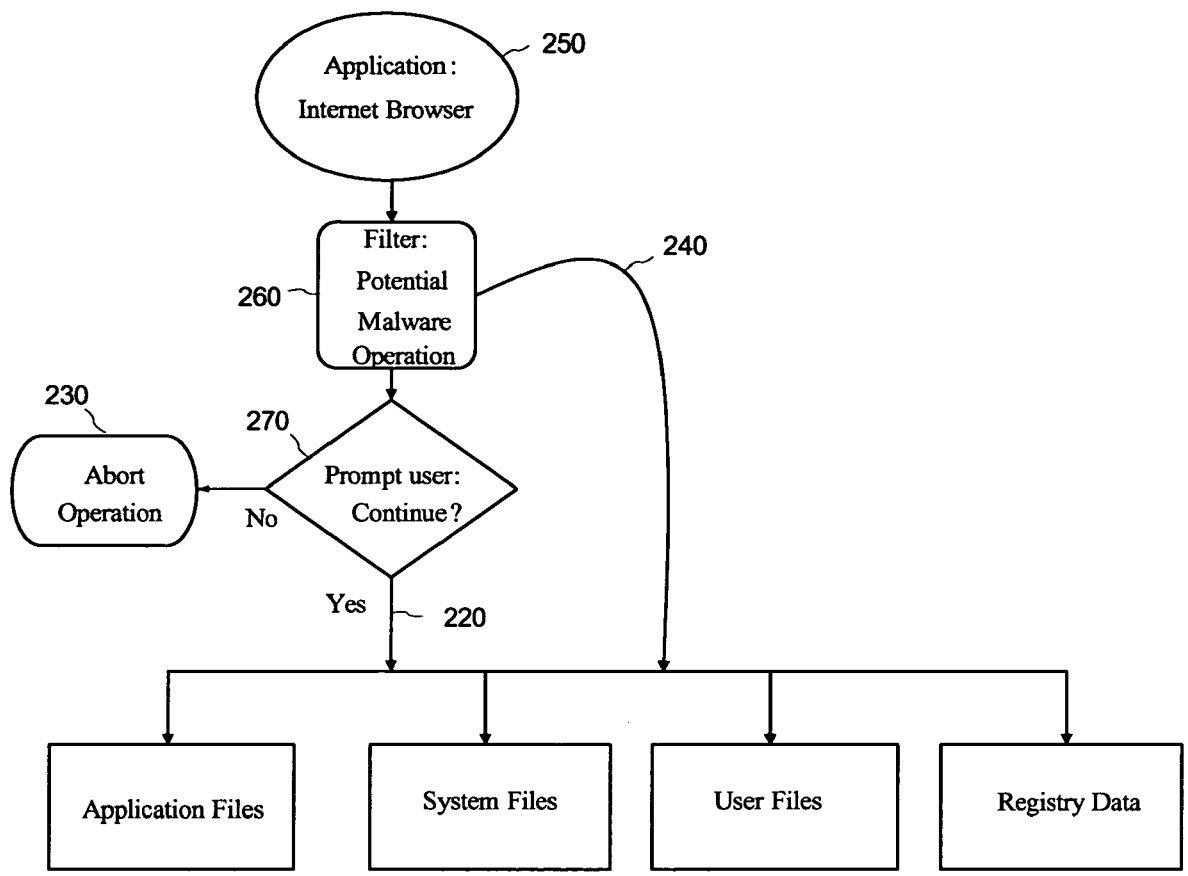
FIG. 2 is a block diagram depicting a prior art method of malware control.

The following definitions are used in this specification:

Computer platform: A computer system with a single instance of a fully functional operating system installed is referred to as a computer platform. A computer platform, also referred to hereinafter as a computer, includes a processor, an operating system (OS) including a kernel residing on the computer platform, and a set of associated system objects compatible with the kernel and the processor.

Application is a set of objects associated together for performing a function or a service; an application includes an object executable by an operating system for performing a task related to the service provided by the application. The term "application" is also used herein to mean a process or processes executing instructions from the application objects.

User mode: The context in which applications execute.

Kernel mode: The context in which the kernel portion of an operating system executes. In conventional systems, there is a physical separation enforced by hardware between user mode and kernel mode. Application code cannot run in kernel mode.

Capsule: An aggregate of objects required to successfully execute a software application or several software applications on a computing platform and provided specifically for the application(s) is referred to as a capsule. A capsule is not a physical capsule but a grouping of associated objects, which may be stored in a plurality of different locations that is to be accessible to, and for execution on, a single computer platform or one or more servers. The term "within a capsule" or "encapsulated within a capsule", used within this specification, is to mean "associated with a capsule". The terms "capsule" and "capsule environment" are used herein interchangeably.

Application libraries are libraries required by an application in order to run. Application libraries provided by an OS are system objects.

Additional application library, also referred to herein as the application filter library, is an application library that is associated with the capsule and provides support for the encapsulation of an application within the capsule, and includes high-level filters for use in user mode.

Object: For the purposes of this specification, "object" generally means a distinct software created element having a defined function; examples of objects include a file, a group of files, a directory, a registry database, a registry entry including a key, subkey, value, name, etc.

System objects: System objects are objects provided within the operating system, compatible with the kernel of the operating system, and available to applications hosted by the OS; examples include shared libraries and configuration objects.

By way of example, Linux Apache uses the following shared libraries, supplied within the OS distribution:

/usr/lib/libz.so.1
/lib/libssl.so.2
/lib/libcrypto.so.2
/usr/lib/libaprutil.so.0
/usr/lib/libgdbm.so.2
/lib/libdb-4.0.so
/usr/lib/libexpat.so.0
/usr/lib/libapr.so.0
/lib/i686/libm.so.6
/lib/libcrypt.so.1
/lib/libnsl.so.1
/lib/libdl.so.2
/lib/i686/libpthread.so.0
/lib/i686/libc.so.6
/lib/ld-linux.so.2

Apache uses the following configuration files, also provided with the OS distribution:

/etc/hosts
/etc/httpd/conf
/etc/httpd/conf.d
/etc/httpd/logs
/etc/httpd/modules
/etc/httpd/run By way of example, together these shared library files and configuration files form system files provided by the operating system and used by Apache. The term "system objects" in this specification includes system files. There may be any number of other files and objects included as system objects. Additional files might be included, for example, to support maintenance activities or to start other network services to be associated with a capsule. System objects of later versions of Windows™ OS include registry objects.

An object namespace is understood as a structured set of links, or pointers, wherein the links can be object names, or aliases, or symbolic links to physical objects, or inodes. The object namespace provides a mapping between names and objects in the system (e.g., files). The primary use of object names is to enable identification of objects by the applications and the OS. A user usually refers to an object by a textual name. The textual name is mapped to a lower-level reference that identifies the actual object, including a location and object identifier. An example of an object namespace is a directory or a folder. An object which name, i.e. an identifier within a computer system, belongs to a particular object namespace is referred to in this specification as being associated with this namespace, being from this namespace, or belonging to this namespace.

An OS-defined system object namespace is an object namespace that is defined by the operating system, typically at installation thereof or when the OS is configured, and includes system objects, such as shared OS libraries that are provided with the OS for use by applications installed onto the computer platform. Applications requiring system services supported by system objects access these objects and services via the OS-defined system object namespace.

A capsule-related object namespace is a namespace that is provided with a capsule and includes links to objects associated with the capsule. The capsule-related object namespace is logically distinct from the OS-defined system object namespace. The capsule-related object namespace is accessible to a software application associated with the capsule, and processes originated therefrom, and said namespace is not generally accessed by applications external to the capsule. The capsule-related object namespace is also referred to as the capsule object namespace, or the capsule namespace.

Encapsulation of an object within a capsule means that the object is included within the capsule-related namespace as opposed to the OS-defined system object namespace.

Malware is software designed to infiltrate or damage a computer system, without the owner's consent; for the purpose of this specification, malware includes computer viruses, computer Trojan horses, spyware, internet worms and adware.

Conduit application is any application that can serve as a conduit to malware; examples include applications with internet access, such as a browser, an email client, an instant messenger client, etc.

Certain software applications, in particular applications that access a network, such as but not limited to the Internet, can serve as conduits for malware, via which the malware can be loaded onto a computer platform whereupon the application is running. Such applications are referred to herein as malware conduit applications, or simply as conduit applications; a typical example of such an application is an Internet browser. The present invention provides a method for protecting the computer platform from the malware by encapsulating one or more of the conduit applications within a protected secure capsule environment, so as to prevent the conduit application or any processes originated therefrom from accessing and making changes to objects associated with the OS or with other applications running on the computer platform outside of the capsule environment, thereby preventing the malware provided via the conduit application from contaminating the computer platform outside of said secure protected environment, or capsule.

Protection of the operating system and most applications running on this computer platform is thus provided in the present invention by the isolation of the conduit applications within a secure capsule environment, which can be safely removed from the computer platform, together with any changes introduced by the malware to the computer platform, without affecting the computer operation.

An application capsule which is described in greater detail hereafter and in U.S. patent applications Ser. Nos. 11/380,285 and 11/415,028 included herein by reference for all purposes, provides a mechanism that enables the persistent state of a software application to be kept local to the application, independent of the underlying infrastructure and other applications.

DESCRIPTION OF EXEMPLARY EMBODIMENTS

Exemplary embodiments of the system and method of malware containment by application encapsulation according to the present invention will now be described.

In the following description, a software application will be viewed from the perspective of its place within the computing platform, considering the salient elements of the software application and how the elements interact with the operating system (OS). This architectural view affords a clearer understanding of application requirements and dependencies.

Figure 3:
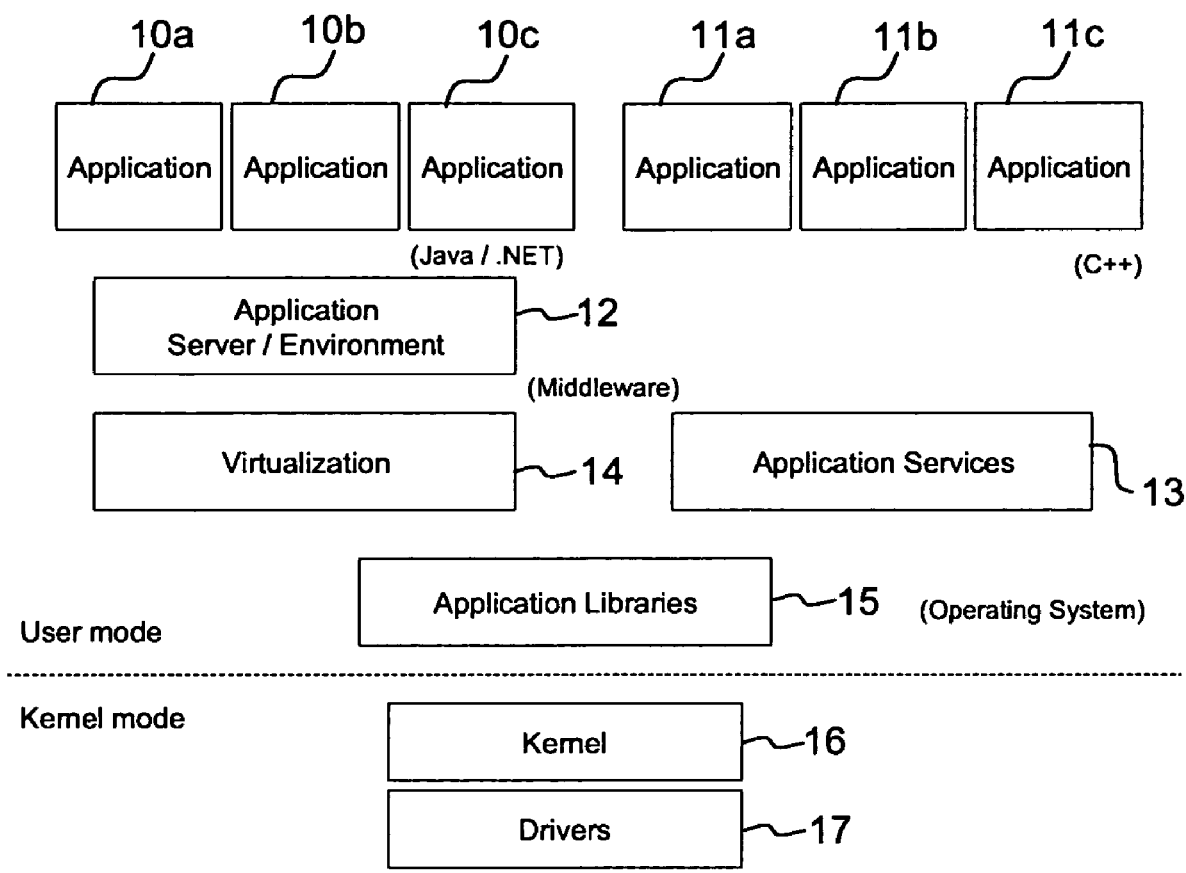
FIG. 3 is a prior art block diagram of two types of software applications, one using Java/J2EE or .NET services, and a native software application based on C++ services.

Prior art FIG. 3 illustrates a basic view of two types of software applications. One is a virtualized application, using Java/J2EE or .NET services, and the other is a native application based on C++ services. In FIG. 3 applications 10a, 10b and 10c represent Java applications wherein 11a through 11c represent C++ applications. The applications 11a through 11c can be executed directly by the computer. The execution of the applications requires use of application services 13 and libraries 15 to access hardware services exported through the kernel 16 and drivers 17. Applications 10a through 10c differ in that they consist of byte codes that cannot be executed directly on the computer. Through the use of virtualization 14, the byte codes are converted into instructions that can be executed on the computer. The application server environment provides an extended set of services available for use by 10a, through 10c. All OS services, whether residing in the kernel or in user mode, are shared among all processes hosted by a kernel instance. With reference to FIG. 3, with both Java and C++ application types, processes interact with shared system services through application libraries or interact directly with the kernel in some rare instances. Application processes utilize kernel services to perform operations outside of their process context. This includes access to hardware, communication with other processes hosted by the same kernel, communication outside the platform, allocation of memory; any processes that extend or transcend the given process context passes through the kernel. These kernel services are accessed through system calls.

While FIG. 3 illustrates how processes within an application 11a, 11b and 11c interact with the broader system 15, 16 and 17 and with each other, it does not illustrate the management of their state. At all levels of an application stack, configuration is generally required. At higher levels of the application stack the configuration tends to be static or predetermined, originating from files. Even in instances where scripts or applets are run to configure specific elements, related services most often acquire their input from configuration files. The lower levels of the application stack often require both static and dynamic configuration. Parameters specific to the OS, network or other facets of the underlying platform and infrastructure are often dynamic. Elements that an application will obtain dynamically include an IP address, hostname, MAC address, system ID, and more. Applications typically obtain these dynamic values from the OS 15, 16, through defined interfaces 15.

Figure 4:
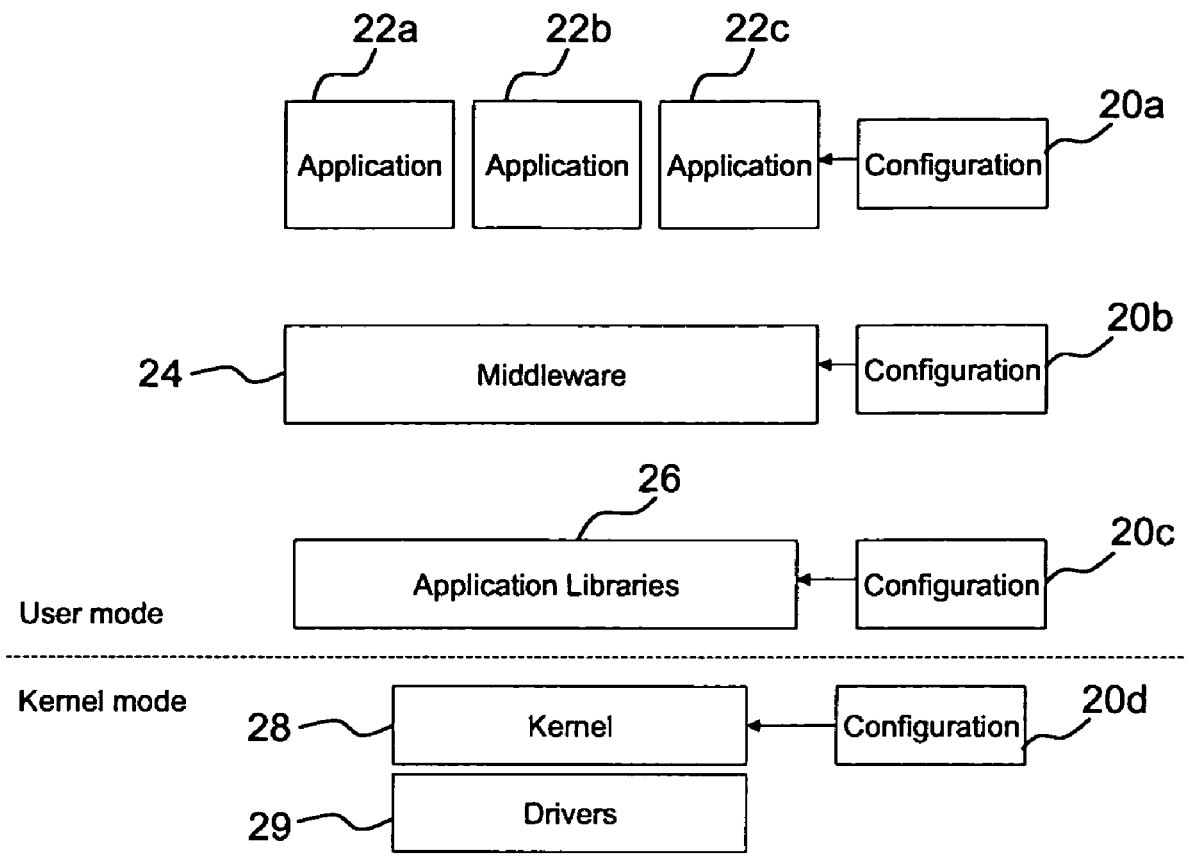
FIG. 4 is a prior art block diagram extending the application model shown in FIG. 3 to include configuration elements.

FIG. 4 extends the application model to include configuration elements 20*a*, 20*b*, 20*c* and 20*d*. Configuration elements are applied to the application stack at all levels, creating state dependencies. The applications 22*a*, 22*b* and 22*c* are shown using extended services described as middleware 24. OS services are exported through the use of application libraries 26. These libraries 26 support access to kernel services 28. The kernel controls access to drivers 29. Configuration is applied to the software stack at all levels. Applications 22*a*, 22*b* and 22*c* receive configuration in the form of user defined values as shown in 20*a*. Middleware configuration is applied in 20*b*. Application library configuration is applied in 20*c*. The kernel is configured as shown in 20*d*.

Software applications that are designed or configured for use with a specific OS distribution typically are dependent on system services supplied by the OS distribution. These system services may take the form of low-level libraries or for example a service may be the loader that places images in memory and manages shared libraries or DLLs. These services may include helper applications, scripts and/or language environments. Where network services are required in conjunction with an application, more often with server applications, a number of processes external to the application itself may be required to support capabilities like RPCs, network mount points, remote management and so forth.

Figure 5:
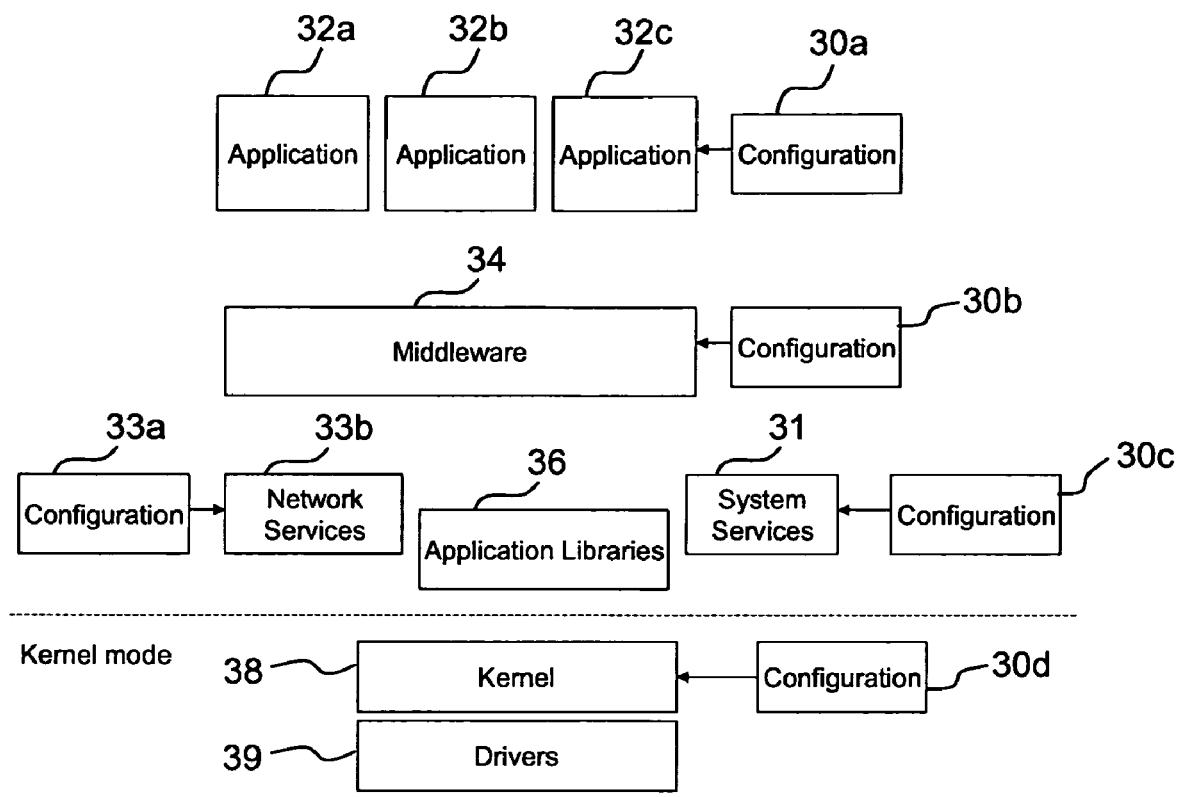
FIG. 5 is a prior art schematic diagram extending the application model of FIG. 4 to show how system services interact with applications.

FIG. 5 expands the application model to include dependencies on system services 33*b* and 31. Applications 32*a*, 32*b* and 32*c* are C++ applications they utilize middleware services 34. Access to OS services is provided by application libraries 36. The kernel 38 controls access to hardware services including all drivers 39. Configuration is applied to the software stack as shown in 30*a*, 30*b*, 30*c*, 30*d* and 33*a*. Extended OS services consist of network services 33*b* and system services 31. Network services 33*b* are exemplified by capabilities such as RPC services. System services 31 include capabilities such as logging.

The application libraries 36 provide an interface to system services for the applications, and configuration objects defining static and dynamic states of the application, are associated with the system object namespace, which is typically defined at the time of the OS installation and/or configuration, and is therefore referred to herein as the OS-defined system object namespace. Applications that are installed onto the computer platform and require access to system resources and services provided by the shared system application libraries 36, access the shared system application libraries 36 via the system object namespace, which is known and accessible to the applications.

Figure 6:
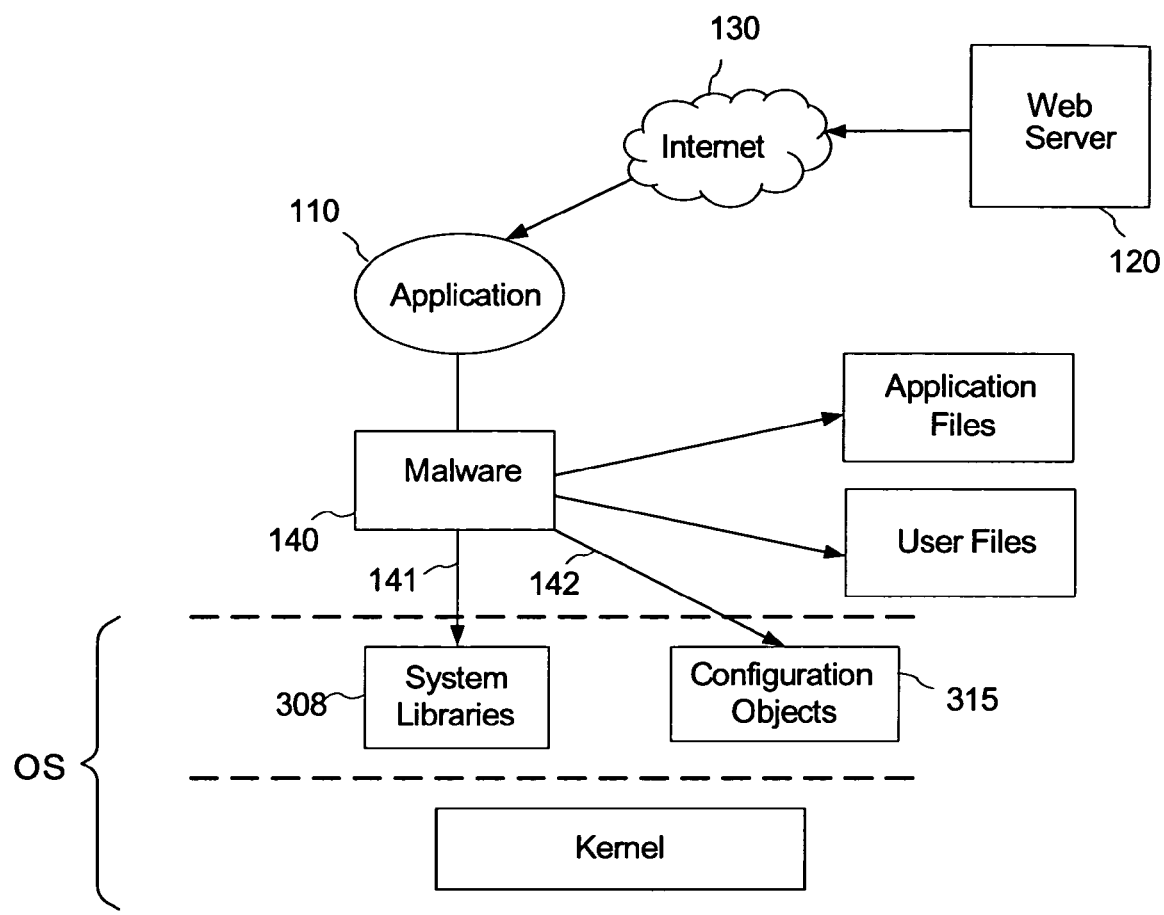
FIG. 6 is a schematic diagram showing how Malware affects a prior art computer platform.

FIG. 6 shows a conduit application 110 which has access to a network 130, by way of example—an Internet browser for accessing the Internet. A visit to a website results in objects being downloaded from a remote server 120 to the computer platform. Examples of objects that can be downloaded include image files, Flash files, scripts, e.g. Java and/or PHP, and, for Microsoft Windows™ OS family hereinafter referred to generally as Windows OS, DLLs (dynamically linked library files). Among legitimate objects, malware 140 can be downloaded, which can also include image files, scripts and/ or small programs, and DLLs. Once the objects are downloaded, the browser loads and displays images, and loads and executes scripts and/or small programs that can lead to malicious changes to the computer platform.

By way of example, we consider herein a known type of malware that, when downloaded, changes a toolbar of the browser. A particular aspect of this example is that the results of the malware contamination are visual and can be easily recognized by the user; most malware operations result in hidden operations being performed. However, the example illustrates salient points of malware contamination. Also by way of example, we assume that the computer platform runs a version of Windows OS, and the browser is a version of the Microsoft Internet Explorer™ (IE).

As the downloaded malware scripts or scripts of this example execute, they perform the following operations:

a. make changes to a set of system objects 308 that is associated with the OS-defined system namespace, as schematically shown with arrow 141; in this example this includes installing one or more DLLs in the folder defined in the registry as the system folder, typically— c:\Windows\System or c:\Windows\System32 b. make changes 142 to system configuration objects 315, in this example—Windows registry; for example, the following new entry can be added in the registry:

"HKEY_CURRENT_USER\Software\Microsoft\ Windows\CurrentVersion\R un"

--or--

"HKEY_CURRENT_USER\Software\Microsoft\ Windows\CurrentVersion\R unOnce", which causes a program that has been downloaded, potentially one with malicious intent, to be run when the platform is first started from a power-on state;

c. Add an entry to the registry key

'HKEY_LOCAL_MACHINE\SOFTWARE\ Microsoft\Internet Explorer\Toolbar'

--and/or--

'HKEY_CURRENT_USER\Software\Microsoft\ Internet Explorer\Toolbar\WebBrowser', which causes the toolbar entry and toolbar layout to be modified the next time IE starts.

When IE starts the next time, it will reference registry entries to determine its toolbar configuration and will find details regarding the new toolbar. The code required to display and manage the toolbar, e.g. the downloaded malicious DLL, is easily found in the system folder as previously downloaded.

The registry entries directing a program to execute when the computer platform starts is used in some cases to "bootstrap" certain capability. It is a common means for escaping the browser environment. This is enabled through the download of a program or script that can then be executed outside of the browser environment when the computer platform starts. The malicious program or script executing outside the confines of the browser is able to make further changes to the computer platform that may detrimentally affect the OS and other applications that share resources with the conduit application, in this case—the browser.

The method and system of the present invention, which provide for encapsulation of the conduit applications within secure capsule environment, protect the OS and other applications from malware-induced changes by creating for the encapsulated application and all processes originated therefrom, including the malware processes, a virtual system-like environment that supports normal operation of the application and related processes, while making the OS-defined system namespace virtually "invisible" for the malware that runs in the context of the encapsulated application, thereby localizing substantially all malware-induced changes within the capsule environment.

Figure 7:
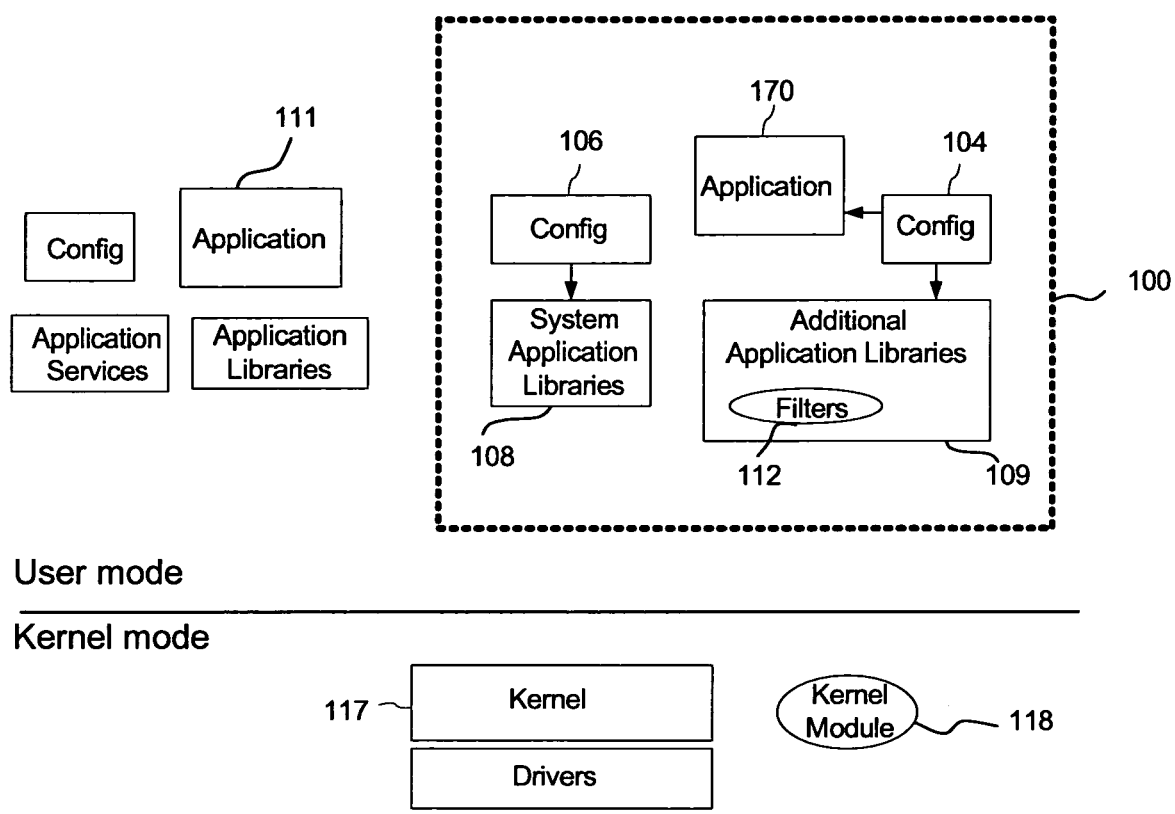
FIG. 7 is a general block diagram of an application capsule.

FIG. 7 shows an example of a capsule 100 provided within a computer environment in accordance with the present invention. A first application 170 is encapsulated within the capsule environment 100. A second application 111 is external to the capsule 100. The first application 170 makes use of a set of associated capsule-related system objects 108, also referred to as application libraries, provided with the capsule to be used by the first application instead of application libraries or other objects provided with the OS. At least one additional application library 109 is further provided for supporting runtime functioning of the capsule, as described hereinbelow. Further included in the capsule environment 100 are a system configuration object 106 and an application configuration object 104, which can also be embodied as one object. The capsule 100 does not include a kernel, so that all processes within the capsule are executed in user mode. Both the encapsulated application 170 and the non-encapsulated application 111 utilize the same OS kernel 117.

In accordance with an aspect of this invention, the software application capsule 100 provides and supports its own unique capsule-related object namespace, which is distinct from the OS-defined object namespace, and encompasses all objects supplied with the capsule or added to, e.g. using installation procedures or by processes running within the capsule, as supported by the capsule runtime software described hereinbelow more in detail. By way of example, in UNIX OS the capsule related object namespace can be a hierarchical directory structure of the form
/export/capsules/foo/bin
/export/capsules/foo/etc
/export/capsules/foo/usr
/export/capsules/foo/var
/export/capsules/foo/lib
/export/capsules/foo/opt By way of another example, in a Windows OS, the capsule object namespace can be organized as a folder structure
C:\Capsules\Foo\
C:\Capsules\Foo\Windows
C:\Capsules\Foo\Windows\System This capsule object namespace, when supported by the capsule-runtime (CR) software, provides an application environment for the first application that emulates a conventional OS environment but is local to the capsule, so that substantially all application-related changes to the computer platform remain local to the capsule, with possibly a few pre-defined exceptions in some embodiments as described hereinbelow.

A detailed description of the capsule-related object namespace and mechanisms for supporting it is given in U.S. patent application Ser. No. 11/415,028 which is incorporated herein by reference.

In operation, the additional application library 109 provides high-level system service filters 112, which manage a dynamic state of the first application 170 by tracking processes running within the capsule 100 and monitoring and/or modifying data provided to and or/from the application 170. The system service filters 112 are not applied to applications executing outside the capsule environment such as an application 111, but only to the first application 170 or other applications within the capsule. The system service filters 112 operate to filter all system service requests originated by any process within the capsule, i.e. by any process associated with the first application 170 or originated therefrom, e.g. by any child process thereof, and re-direct these requests first to appropriate application libraries 108 which are referenced within the capsule object set. This process can be viewed as object mapping wherein OS system objects, such as shared application libraries and configuration objects, are mapped onto capsule-related system objects 108, 104 and 106, and the later used by the first application 170 in place of the former.

By way of example, the system service requests that are intercepted by the filters 112 include 'open', 'stat', 'access', 'execve', 'chown', 'creat', 'mkdir', 'mknod'.

The following description exemplifies the method and system of the present invention for malware isolation by encapsulating conduit applications for a computer platform running a version of Windows™ OS, wherein the first, conduit, application is Microsoft Internet Explorer (IE) browser that is encapsulated within a capsule, and malware is the toolbar-changing malware 140 described hereinabove with reference to FIG. 6.

Figure 8:
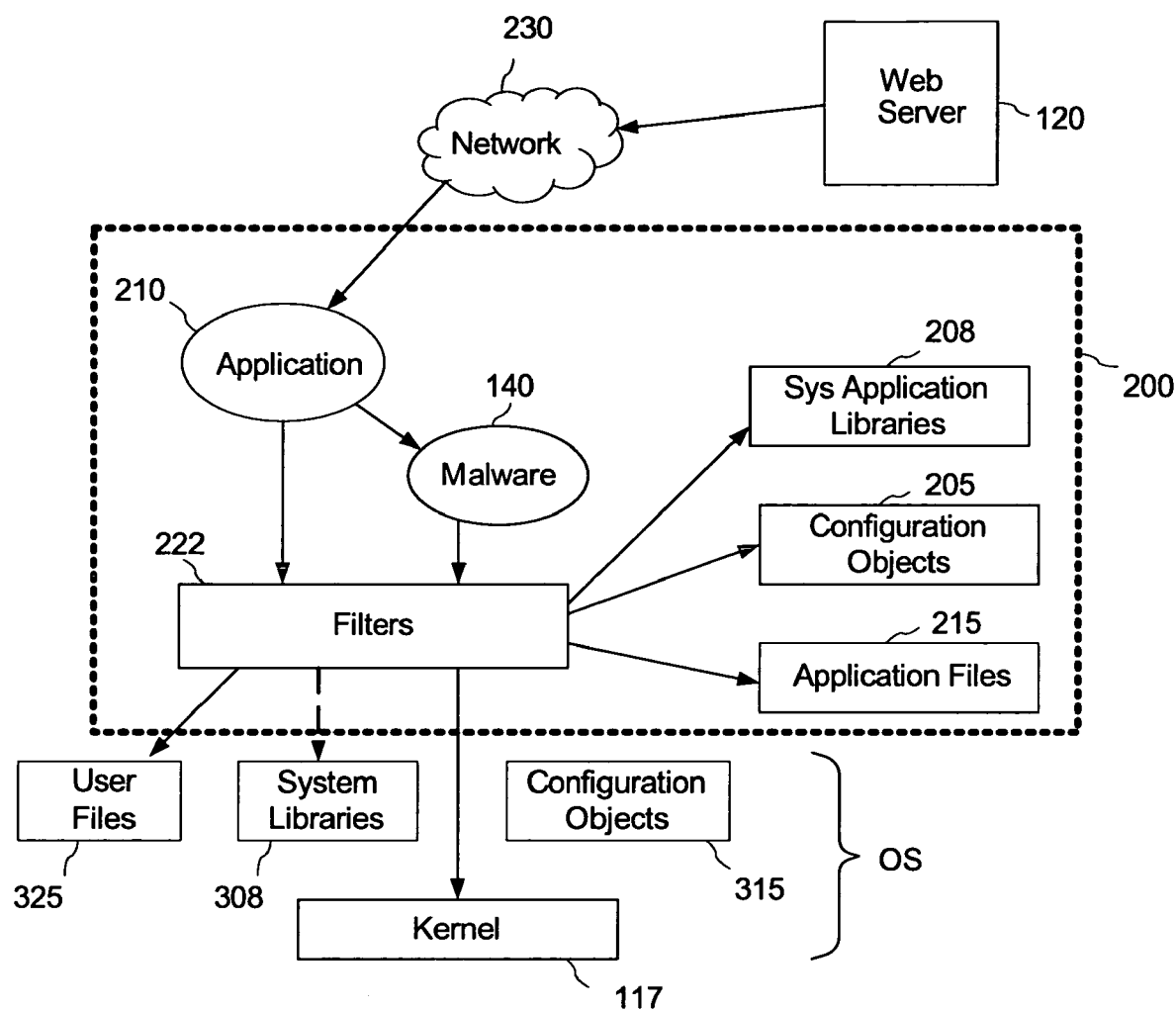
FIG. 8 is a block diagram depicting the malware containment model according to the present invention.

Turning now to FIG. 8, the capsule 200 object set in this example includes OS-supplied system files 208 and applications files 215 associated with the IE, which together include the following files:

iexplore.exe, AcroIEhelper.dll, dxtmsft.dll, dxtrans.dll, iepeers.dll, MSHTML.DLL, OUTLIB.DLL, SHDOCVW.DLL, shell32.dll, URL.DLL, ntuser.dat, mshtml.tlb.

Note that in other embodiments, the application-specific capsule 200, which will be also referred to hereinafter as the IE capsule, can include a somewhat different selection of system files, with a number of possible variations.

The IE capsule 200 also includes the additional application library that provides the high-level system service filters 222, which constitute the Capsule Runtime (CR) software, also referred to as the CR component of the capsule 200 when in opertaion, and provide access to the capsule object set for processes that execute in the capsule context. The CR software is used to manage the dynamic state of the application, in this case—the dynamic state of the IE browser 210 as it executes. This application dynamic state management is accomplished by filtering system services.

The system service filters 222 include filters that perform the following types of operations:
  a. Process tracking. All processes are identified as being associated with a given capsule or with the underlying OS.
  b. Information. Resources used by all processes within a capsule environment are tracked and made available. In addition, application behavior, based on known profiles, can be tracked and any variance reported.
  c. Application state management. Certain values returned by system services are modified, or altered such that application isolation is maintained; this can be referred to as spoofing values returned by the OS. This includes ensuring that processes executing in a capsule environment use files and other objects based on the associated capsule object set, which is provided by the object mapping functionality of the service filters 222.

The object mapping functionality is important for ensuring that changes related to the conduit application 210 and associated malware processes 140 are kept local to the capsule environment 200 and are substantially isolated form the underlying OS, in this case—Windows.

In one embodiment of the invention, the file mapping component of the object mapping is accomplished by using system service filters with all services that manipulate path names. By way of example, these services in Windows OS based computer platforms can include, but are not limited to, 'NtCreateFile', 'CreateFile', 'FindFirstFile', 'LZOpenFile';

also by way of example, in Unix-based systems these services include 'open', 'create', 'stat', 'access', 'execve', 'chown', 'creat', 'mkdir', 'mknod'. Utilizing these and similar OS capabilities, the system service filter 222 determines where the defined file is to be located. It subsequently may use a modified path name to open the file. If a different path name is used to access any given file, this is transparent to the software application.

In one embodiment of the invention, the system service filter searches three general locations, current capsule file set, OS or other shared capsules to locate each file, the first file located in a predetermined search order is the one used by the application. User intervention from a command line can be optionally used to control the search order.

Managing of configuration requests is another important function of the filters 222 that enables the malware confinement. For Windows OS this amounts to managing registry values requests. To this end, the present invention provides a registry requests filter within the service filters 222, which in one embodiment is in the form of an embedded database for managing registry configuration requests. Other aspects of dynamic state management of the application 210 by the filters 222 include managing such sate parameters as IP address, hostname, and system ID.

In accordance with one aspect of the invention, requests by an encapsulated application for registry values can be mapped to capsule specific values using the application filters, e.g. filters 222. By way of example, a non-limiting list of registry services to which filters 222 are applied includes 'RegCreateKey', 'RegOpenKey', 'RegEnumKey', 'RegEnumValue', 'RegGetValue', 'RegSetValue', 'RegQueryValue'. In a Windows OS filters 222, in one embodiment, other implementations are possible, are installed and intercept operation is enabled using the Windows supplied library preload capability. An additional application library, in the form of a Windows DLL, is loaded into application memory using the Windows OS library preload capability. Using the Windows supplied library preload capability a function contained in the additional application library is configured such that it is called by the application before the original OS defined function. This approach establishes the basic system service filter capability as embodied in one instance of the invention for the Windows OS. Once established as described, filter operation associated with registry services ensures that any registry values defined in a capsule registry object from the capsule object set are provided to the application in place of values obtained from the Windows OS. In similar fashion any registry values that are not found in the capsule object set are provided to the application from the Windows OS, e.g. from the Windows OS registry 315. The filters associated with registry operations, as defined above, reference values maintained in data objects internal to the filters, embodied in the additional application library and managed through the use of an embedded database. When an encapsulated application requests a registry value the filter specific registry values are referenced. If a value is located in internal data objects, managed by the filters themselves, then that value is returned to the application. When a registry value is modified by the encapsulated application, the registry modification is applied to the capsule registry object or objects; no modification is made to the Windows OS registry 315. This ensures that any registry changes are isolated to the capsule and do not affect the OS. In one embodiment of the invention, registry keys, sub keys and values that are located in the capsule object 215 are managed by an embedded database. The operation of the embedded database is such that a file is used for backing store. The backing store is located in the capsule object namespace.

An embedded database provides functionality allowing a database schema that corresponds to the Windows registry; key name, sub key name, value names, values, to be defined. Once the schema is defined as described hereinabove, database operations to lookup and modify entries are straightforward and would be apparent to one skilled in the art.

When the browser 210 executes and accesses the Internet, various files are downloaded and added by the filters 222 to the capsule object set within the capsule namespace instead of their OS-defined default location. Examples of files added to the application files 215 of the capsule object set when the IE 210 executes are: JPEG images (*.jpg), Bitmap images (*.bmp), GIF images (*.gif), Control Panel extensions (*.cpl), Cascading style sheet (*.css), Icons (*.ico), HTML files (*.htm), Jscript files; Java Scripts (*.js), Temporary files (*.tmp).

Configuration objects 205 are in this embodiment registry objects that contain registry values that are specific to the IE 210. In one embodiment, no registry entries are added to the capsule object set during initial capsule creation. It's possible to add registry entries related to the IE 210 as desired, but is not necessary for operation. However, when the IE executes, it may generate registry value requests. Any registry changes made in accordance with these requests, e.g. changing existing values and creating new keys, subkeys or values, will be placed within the capsule object set in registry objects 205, which will be created by the CR component 222 of the capsule 200 as required. These capsule-specific registry objects 205, which are substantially local to the capsule 200 are inconsequential for the rest of the computer platform, will be referred to hereinafter as the virtual capsule registry, or simply as the virtual registry. After the first time IE 210 is run in the capsule context there will be various registry entries located in the capsule virtual registry 205. These are the result of registry access requests made when the IE 210 executes. Any registry values that are present in the capsule virtual registry are supplied to the IE 210 as it executes by the system service filters 222 instead of values from the Windows registry 315. No modifications to the Windows registry 315 are performed as the IE 210 executes in the capsule context.

Some of the registry entries modified as IE executes, and therefore placed in the capsule object set include, but not limited to:

HKEY_CURRENT_USER\Software\Microsoft\Internet Explorer\Main

HKEY_CURRENT_USER\Software\Microsoft\Internet Explorer\Settings

HKEY_CURRENT_USER\Software\Microsoft\Internet Explorer\Toolbar

HKEY_CURRENT_USER\Software\Microsoft\Internet Explorer\TypedURLs

HKEY_CURRENT_USER\Software\Microsoft\ Windows\CurrentVersion\RunOn ce

Once a malware-infected website is visited, the malware is downloaded from the remote server 120 together with legitimate files and objects, as described hereinabove. In contrast with the prior-art example described with reference to FIG. 6, in the present invention wherein the IE browser is encapsulated within the capsule environment 200, the filters 222 intercept system services, and re-direct them first to files and objects within the capsule environment. These filters operate on a requested service before it is passed to the OS. The filter operation in this context causes the images, scripts, DLLs and any object, including files that are created, to be placed in the application specific file/object set. Where the default operation in prior-art systems results in the browser storing files and objects downloaded from a remote server in the OS-defined system object set, e.g. directories or folders such as C:\Windows\System, the filters 222 re-direct the downloaded objects to be stored within the capsule object set, in the case of downloaded files—within the application specific directory, by way of example—in C:\Capsules\CapsuleName.

As malware-related scripts 140 downloaded by the IE 210 execute under the management of the system service filters 222 as described hereinabove, the changes that they cause are all directed by the filters 222 to be confined to objects defined within the capsule-related object namespace:

a) downloaded DLL are placed in the application libraries 208 within the capsule-related object namespace, e.g. c:\Capsules\CapsuleName, instead of the folder defined in the registry as the system folder;

b) new registry entries added by the malware are directed to the virtual registry 205 and are added thereto, such as "HKEY_CURRENT_USER\Software\Microsoft\Windows\ CurrentVersion\Run"

--or--

"HKEY_CURRENT_USER\Software\Microsoft\Windows\ CurrentVersion\RunOnce"; these entries are intended to cause a malicious program downloaded as malware by the IE to be run when the platform is first started from a power-on state.

In this malware example the malware 140 will also generate a registry request to add the following entries that causes the toolbar entry and toolbar layout to be modified the next time IE starts: "HKEY_LOCAL_MACHINE\ SOFTWARE\Microsoft\Internet Explorer\Toolbar"

--and/or--

"HKEY_CURRENT_USER\Software\Microsoft\Internet Explorer\Toolbar\WebBrowser", to the OS registry.

Filters 222 intercept registry services originated from all processes within the capsule and cause the change to the registry keys to be placed in the virtual registry which is specific to the application, in this case—the IE 210. The values managed by this application specific virtual registry are used by processes that make up the application being managed and all children processes thereof. The application specific virtual registry 205 is not used with processes that are not related to the capsule 200 and are not tracked by the filters 222.

When IE 210 starts it will reference registry entries to determine its toolbar configuration. The filter 222 will re-direct these requests to the virtual registry 205, and return registry values to the IE 210 with details regarding the new toolbar. The DLL code required for the toolbar is easily found, under the direction of the filters 222, in the capsule "system" folder containing application libraries 208 as previously downloaded. File requests generated by the IE 210 to the system folder are redirected by the system service filters 222 to the application-specific capsule system folder 208 instead of the Windows system folder containing shared application libraries 308. The filtering and re-direction process is transparent for the application 210 and the malware process 140, which are not aware that the redirection has occurred.

According to the present invention, the behavior created by Malware 140 as the result of the registry changes, downloaded and executed scripts 140, downloaded and installed DLLs, is not modified by the presence of the capsule environment 200. For example, if a toolbar is displayed by the browser 210 because of Malware-induced changes, the toolbar will be displayed when the browser 210 is started in the context of the invention. The difference is that the changes applied to the computer platform by the Malware, i.e. added or changed registry values, new or changed application and system files, are contained within the application specific object set 208, 205, 215, i.e. localized to objects within the respective capsule-related namespace. The OS and other applications running outside of the capsule 200 context are not modified by the IE 210 and the malware 140. It is possible to configure the capsule, during capsule creation, such that user files 325 that are accessed by the application 210 are not located in the capsule object namespace. In this embodiment when user files 325 are accessed by application 210 the filters 222 cause the user files 325 to be found in the location defined by the OS, i.e. in the OS-defined system namespace, not the capsule object namespace.

Similarly, other possible malware-induced changes to the computer platform remain local to the capsule. For example, changes to registry values such as the "RunOnce" entries that are used by Malware to cause a malicious program or script downloaded with the Malware to execute at system start time, when the browser 210 is not running, will be placed in the application specific virtual registry 205. Since the virtual registry 205 is local to the capsule 200 and is substantially isolated from the OS, the OS at start time will not reference them, and these malicious processes will not be started at system start time.

The aforedescribed example dealt with a conduit application, in particular—Microsoft Internet Explorer™ in Windows environment. Although may be currently less frequent, malware is known also to affect UNIX or Linux environments, and the MAC OS X. Those skilled in the art would appreciate that most of the aforedescribed features of the system and method of the present invention for malware isolation are easily transferable to computer platforms operating under UNIX-type or Linux-type OS, or MAC OS X, although particular implementation of e.g. CR software will be obviously different. For example, configuration objects used by UNIX OS are not registry but configuration files. Accordingly, in such environments the capsule configuration objects are configuration files which include configuration values pertinent to a particular application 210. By way of example, configuration objects used with a conduit application such as the Mozilla Firefox™ browser within a capsule in a Linux platform can be as follows: /etc/hosts, /etc/mtab, /etc/group, /etc/passwd, /etc/fstab, /etc/termcap, /etc/resolv-.conf, /etc/localtime.

The present invention thus provides malware isolation by confinement of conduit applications within a secure capsule environment; this isolation is primarily afforded and controlled by the following two means:

1) Capsule object set content; the files and other objects placed in a local capsule file namespace define which files will be used local to the capsule. The files/objects located in a capsule object set are used by application processes executing in a capsule environment instead of files located in the underlying OS.

2) System service filters; by defining which system services are filtered and the specific behavior or function of the filter, the degree to which the application is isolated from the OS and other applications is controlled. In a preferred embodiment, a filter is applied to any system service request from the encapsulated application that is using a pathname argument.

In one embodiment, replicas of all shared application libraries and configuration objects that come with the OS distribution can be included in the capsule object set. In this embodiment, the capsule can be used for encapsulating different applications. Filters provided by the capsule runtime component, also referred herein as the CR filters, such as filters 222, operate primarily by mapping system service requests to corresponding application libraries and configuration values provided within the capsule object set. However, this embodiment may not be optimal due to capsule size and resource considerations.

In another embodiment, only application libraries and optionally configuration objects required for executing a particular conduit application to be encapsulated are included in the capsule object set. Such a capsule is then application-specific.

In yet another embodiment, only a sub-set of application libraries and optionally configuration objects that are required for execution of a particular conduit application to be encapsulated are included in the capsule object set. Preferably, this subset includes all system objects which state can be altered by the conduit application or by malware processes originated from the conduit application. In Windows environments, these objects preferably include registry objects. However, for some of the shared application libraries that may be required by the first application, no replicas may be supplied to the capsule object set. To make any additional OS environment files available to a process executing the application in the capsule context, the object namespaces of the application capsule and the underlying OS environment must be merged into one composite namespace. This is accomplished by filtering service requests from the encapsulated application that use a path name in a specific way so to map an original path name to one from a plurality of sources.

Accordingly, in another embodiment of the invention, the CR filters include a search algorithm, wherein three general object sets are searched when a particular object request is generated by the encapsulated application or any process originated therefrom, in the following order: 1) the object set of the current capsule wherein the request is originated, 2) an object set of a shared capsule, when installed onto the computer platform as described hereinbelow, and 3) the OS-defined object set containing the system application libraries supplied with the OS distribution or installed within the OS-defined object namespace at a later time. If a replica of a system file supporting the requested service exists within the capsule object set, it will be found first and used in place of the corresponding system file from the OS-defined object namespace, e.g. the folder c:\WINDOWS\system in a Windows-running platform, or the directory \usr\lib in a UNIX-running platform. If the capsule object set does not include the requested system file, a first system file supporting the requested service that is found outside the capsule by the CR filter in the predetermined search order will be the one used by the application. A list of all objects, or files, included within the capsule object can be maintained within the capsule environment, which is used by the CR filters in the aforedescribed search process in some embodiments. User interaction from a command line can be optionally used to control the search order.

In a preferred embodiment, the services defined in this invention to locate files, said services embodied in the CR filters, e.g. filters 222, are extended to include the ability to copy a file or another object from one object namespace into another. This copy is performed in the context of an application process running within the capsule. If the process attempts to modify an object outside of the current capsule, i.e. a system file in a shared application library folder, that file or object, e.g. a registry object, is copied into the capsule object set. This mechanism prevents malware that is running in the context of the encapsulated application, i.e. which process id is being tracked by the CR filters, from changing objects outside of the capsule object set, while enabling the application to execute successfully even when the initial capsule object set was lacking the required replica.

The copied object, which is also referred to hereinafter as the replica object, has the same object ownership and permissions as defined by the underlying OS as the original file. It is possible that the current process will not have the privileges to set the correct owner and permissions on the copied file. An external program, such as a UNIX defined "setuid" copy program is used to perform the copy and ensures proper file permissions.

The aforedescribed file mapping supported by the CR filters effectively merges the unique application specific capsule object namespace, or hierarchical file system, with the OS-defined object namespace, while maintaining the effective isolation of the encapsulated application and all processes originated therefrom, and of substantially all system changes affected by them, within the capsule environment. U.S. patent application Ser. No. 11/415,028 which is included herein by reference, provides further details about concrete mechanisms that can be employed by the CR filters to enable the mapping of an original path name to one from a plurality of sources.

Figure 9:
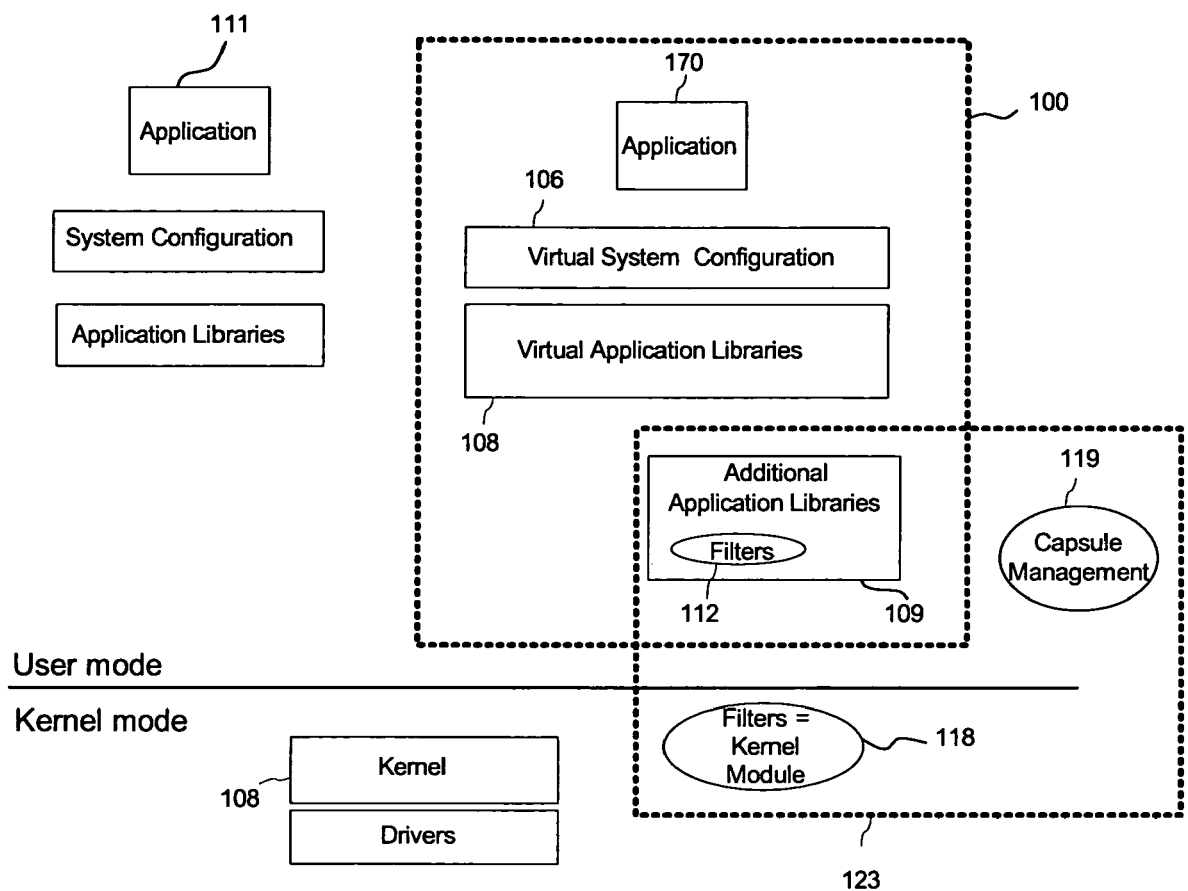
FIG. 9 is a block diagram of an application capsule depicting encapsulation means according to the present invention.

In accordance with the invention, the high-level CR filters 222 described hereinabove with reference to FIG. 8, is one part of the System service filters that support the application encapsulation by re-directing system service requests originated from processes associated with the first application. Since many of these requests are eventually supported by the kernel, the System service filters are used in the invention in both kernel mode and user mode. With reference to FIG. 9, in kernel mode the system service filters are embodied in a loadable kernel module 118. In one embodiment, when the kernel module 118 is loaded the initialization procedure locates the kernel system call table. A specific system service filter is installed by placing a handler in the corresponding system call table entry. The original system call handler is saved for use by the system service filter. When the specific system call in question is executed in the kernel the system service filter handler is called before the original kernel system call handler.

In user mode, the system service filters are the CR filters 112 embodied in the additional application libraries 109, which can be loaded along with the software application 110 executable objects. The system service filter is executed before the original system service. This type of filtering of a system service in user mode is accomplished using a number of well known capabilities. These include, but are not limited to, library preload services, system call trace facilities, and an 'upcall' mechanism. Library preload and system call trace services are offered as standard features in many operating systems, including most UNIX variants. An 'upcall' mechanism allows a kernel resident function to return to a specific location in user mode. This is similar to the operation performed wherein a signal handler is invoked on return from a system call in a Unix system. Those skilled in the art will appreciate that similar capabilities are supported by Windows OS. The additional application libraries 109, which provide capsule-specific CR filters 112, and the kernel module 118 together can be considered as forming the encapsulation means of the present invention, as illustrated in FIG. 8 by filters 222. These encapsulation means can further include capsule management component 119 that supports capsule management including dock, undock, start, stop and status.

Multiple application capsules can be deployed within the same computer platform, for example to individually isolate multiple conduit applications, such as browsers, email clients, instant messenger clients etc. In this case, the same kernel loadable module 118 can be used to support System service filters of all capsules. Also, several applications can be encapsulated within the same capsule.

In addition to an application capsule, another type of capsule provided by the invention in some embodiments is a shared capsule, e.g. to support services shared between multiple capsules within the same computer platform. Some characteristics of a shared capsule, although not limited thereto, are the collection of a set of files that can be accessed by multiple application capsules. Files embodied in a shared capsule are preferably read-only. That is, any attempt by a process within a capsule context to modify a file in a shared capsule will result in the file being copied from the shared capsule to the application specific file set. A software application capsule when combined with a shared capsule and/or files from the underlying OS will provide a full environment capsule.

As stated hereinabove, the aforedescribed method and system of the present invention do not prevent malware to execute on the computer platform and introduce changes; instead, the invention ensures that these changes are localized within the application capsule environment wherein the respective conduit application is running, while preventing the malware from infecting and introducing any changes to the underlying OS or to other applications running outside of the respective application capsule environment.

The invention also provides a relatively easy way to safely delete malware and all malware-induced changes, by either totally or partially disposing of the capsule or replacing it with a new one. In one embodiment, this can be done once malware is deemed to be present on the computer platform; e.g. in the example described hereinabove, once the user notices the toolbar change, or any other unexpected changes in the appearance of the encapsulated application or generally the computer behavior. In other embodiments, since malware presence is not always obvious to the user, the partial or complete replacement of the capsule can be performed at predetermined intervals or events, e.g. at every computer start-up, every time the computer maintenance is performed, or once a day, once a week etc.

In one embodiment, only some of the capsule components are replaced, while others that are unlikely to have been affected by malware remain in the capsule. By way of example, if the conduit application is the IE browser running under Windows OS, the files that can be kept during the partial capsule replacement operation include the one additional application library 109 providing the high-level CR filters 112, and the following application and system files:
iexplore.exe, AcroIEhelper.dll, dxtmsft.dll, dxtrans.dll, iepeers.dll, MSHTML.DLL, OUTLIB.DLL, SHDOCVW.DLL, shell32.dll, URL.DLL, ntuser.dat, mshtml.tlb.

The following files are deleted from the capsule:
JPEG images (*.jpg), Bitmap images (*.bmp), GIF images (*.gif), Control Panel extensions (*.cpl), Cascading style sheet (*.css), Icons (*.ico), HTML files (*.htm), Jscript files; Java Scripts (*.js), Temporary files (*.tmp), Also deleted from the capsule object set are the virtual registry objects, e.g. the file, with registry entries, that is used as backing store for the embedded database that manages the application registry requests as described hereinabove.

In one embodiment, an object list is created at the time of the file creation, as described hereinbelow. The list describes what objects, files and configuration entries (registry), have been placed in the capsule object set. This list defines a default capsule object set, and is used during the partial replacement operation. All objects, files & registry entries that are not a part of the default capsule object set, i.e. are not in the list, are deleted from the capsule object set. All objects that are defined in the list are kept in the capsule object set.

Figure 10:
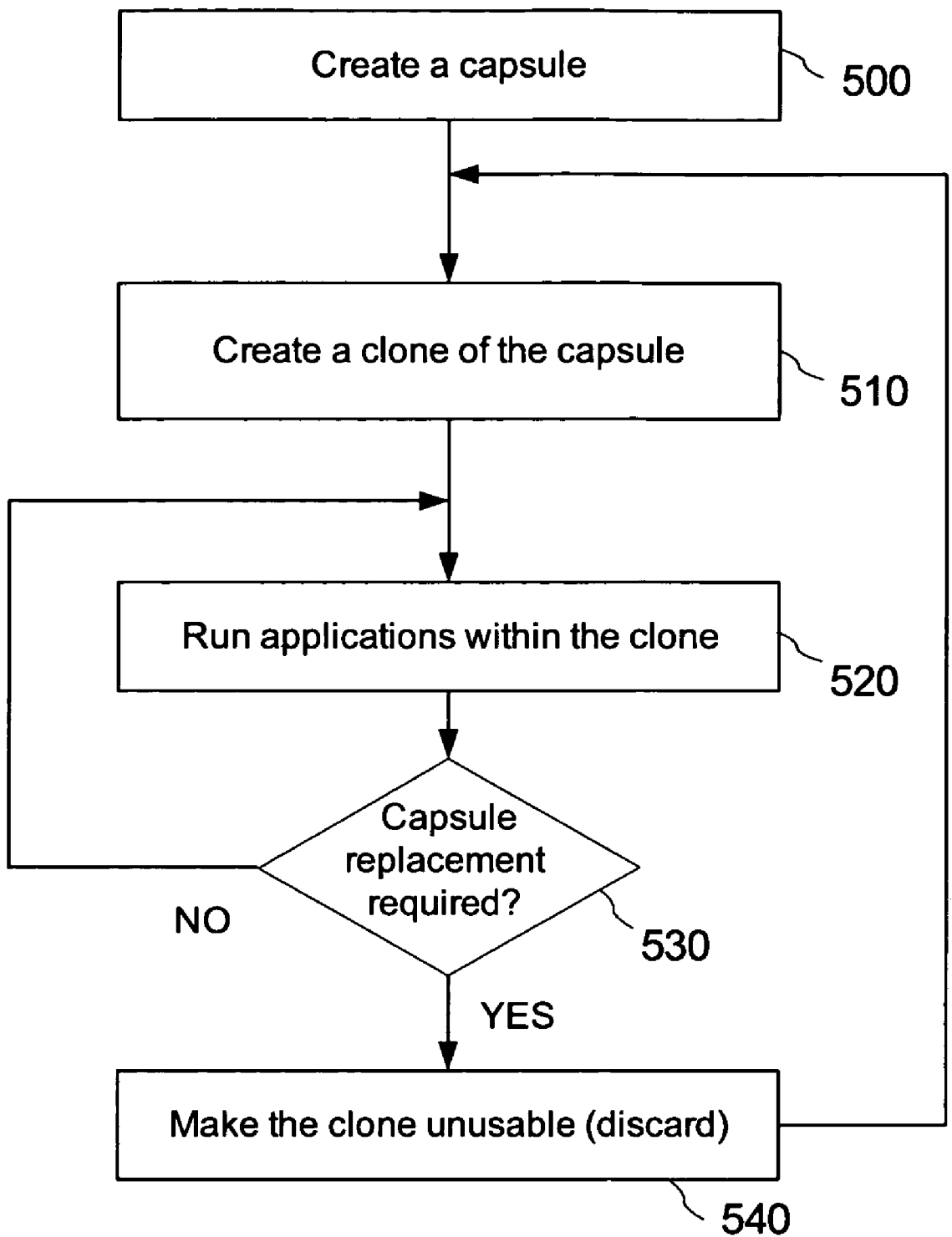
FIG. 10 is a flow chart showing how an encapsulated application which could have compromised by malware can be re-instated in a default not-contaminated state.

In another embodiment, the capsule is deleted as a whole, and replaced with a new instance of the capsule for the same application. This is referred to herein as a capsule flush. With reference to FIG. 10, the capsule flush in one embodiment of the invention includes the following steps.

In a first step 500, an application capsule including the respective conduit application, e.g. a browser, is deployed onto a computer platform, for example as described hereinbelow; a capsule object set is thereby created, e.g. in a directory c:/capsules/BrowserCapsule1. In a next step 510, before the encapsulated application, i.e. the browser, is started, a clone of the capsule is created within the same computer platform, e.g. by copying the capsule content in a new directory c:/capsules/BrowserCapsule2. This results in the presence of two instances of the same encapsulated browser on the computer platform: Browser(1) and Browser(2). Next, one of the browsers, e.g. the Browser(2), is executed 520. Once it is decided in step 530 that the browser replacement is due, the second instance of the encapsulated browser, i.e. the whole directory c:/capsules/BrowserCapsule2, is deleted 540 from the computer platform, and process returns to step 510, wherein a new clone of the first instance of the BrowserCapsule1 is created, that can be referred to again as BrowserCapsule2 housing a new instance of Browser.

To start the Browser in a capsule environment of the clone capsule, or in other words, in the context of the capsule BrowserCapsule2, the CR component of the capsule has to be informed that the respective process associated with Browser is to "belong" to the specific capsule. In one embodiment of the invention, a small program 'trictrl' is provided for this purpose, which can be called for example via a command line interface with both the capsule name and the application name as parameters. In one embodiment of the invention, the respective command has the form of 'trictrl run capsule_name program_name', or 'trictrl run BrowserCapsule2 Browser(2)' for the above given example. The 'trictrl' program starts Browser(2) from the object namespace of the capsule BrowserCapsule2, and and informs the CR that the appropriate process identifier "belongs" to the specified capsule namespace. The CR component of the capsule is preferably activated before the application, e.g. the CR starts as a system service at system start-up when the computer platform boots.

In embodiments wherein applications are called via associated icons in a GUI (graphical user interface), an icon representing the encapsulated application can be linked to the aforegiven scrip calling the 'trictrl' command. In OS with a dynamic library preload facility, e.g. Windows OS, this facility can be used to load the additional application library of the capsule and activate the respective high-level filters, e.g. the filters 122 or 222. An additional control is added to determine if the application is to be considered encapsulated and therefore managed by these filters. In one embodiment, an environmental variable is defined for this control purpose before the application that is to run in the capsule context is started, the presence of said predefined environmental variable indicates that the process and any children processes are to be managed in a capsule namespace. Using this mechanism, other applications running on the computer platform can start the encapsulated conduit application, e.g. the Browser, in the context of the capsule, i.e. under the management of the application filters 122 or 222, by simply calling the Browser in a conventional way.

Having described main components of application capsules and the capsule operation, we will now turn to the capsule creation.

Two methods of capsule creation will be addressed hereinbelow, and either of the two can be utilized with reference to particular embodiments thereof; other embodiments can be possible depending on circumstances, and would be obvious to those skilled in the art from the description of the present invention. Further details are given in U.S. patent application Ser. No. 11/380,285, which is incorporated herein by reference. The two methods differ in that in one instance the capsule creation begins with the system files only. The capsule is created from the system files and then the applications and required files are added and later installed. In the other instance, both system and application files are retrieved, together, from an existing server, and then the capsule is created. In this manner, the capsule object set from the beginning comprises the application and system files and objects.

We start first with the method wherein a capsule is created for an application that has been already installed on a server or a computer platform before the introductions of the system of the present invention. The capsule object set is then created through the use of a Capsule Build Tool (CBT). The CBT enables automated discovery of the files used by an application as well as a manual file dispatch capability. In one embodiment, the capsule creation process follows the following steps:

A) Install CR on any platform that will host capsules; the CR software includes at least the additional application library for supporting the system service filters, and may include scripts and programs to support capsule management capabilities.

B) Install CBT on a platform that has the application to be placed in a capsule.

C) Using CBT define a few general capsule parameters; type, name, description, etc.

D) Through CBT define files to be included in the capsule, those that will be accessed in the underlying OS and any shared files; this can be done, for example, by executing the application to be encapsulated, and using the CR to track files and objects that the applications accesses; then creating replicas of these objects to be placed in the capsule object set. These replicas can be either one-to-one copies of the respective system or application files, or copies that have been modified. The changes made to the subset of the files and other objects that are modified can be quite diverse. Some examples of these changes are: modifying the contents of a file to add a capsule specific IP address; modifying the contents of a directory to define start scripts that should be executed; modifying the contents of a file to define which mount points will relate to a capsule; removing certain hardware specific files that are not relevant in the capsule context, etc., dependent upon requirements.

While application and system objects are placed in the capsule objects set, user specific objects used by the application within the capsule environment can be placed either inside or outside the confines of the capsule environment. User specific objects accessed by a conduit application may include, for example, bookmarks, cookies, and history. In some embodiments, it may be preferred that this used data is placed outside of the capsule environment, so that when the capsule is flushed as described hereinabove, the user data remains available for the new, clean, instance of the encapsulated application. In other embodiments, the user data can be placed within the capsule object set so that they are deleted when the capsule is flushed. The second embodiment provides higher level of security by removing files that can potentially be compromised or otherwise contaminated by malware, at the expense of the loss of the user data.

E) Through CBT define capsule behavior parameters; start/stop scripts, auto dock, capsule identity, etc. By way of example, start/stop scripts in a Linux platform include, but are not limited to, /etc/int.d/syslog, /etc/int.d/sshd, /etc/int.d/portmap.

F) CBT outputs a capsule in template state including the default capsule object set.

G) Using the capsule in a template state on the same platform as CBT is installed, verify that the application functions as expected; use CBT to modify files & parameters as needed until the encapsulated application is functional.

H) Using CBT, activate the capsule. The procedure to activate a capsule includes 1) combining all the files in the capsule file set into a single file and 2) identifying one or more computer platforms that are able to host the capsule; these would include platforms where the CR has previously been installed. In this state the capsule is activated & undocked. The CBT outputs the activated capsule as a single file; the activated capsule can then be moved as required, e.g. to a network file storage, or a local disk of a computer platform. In other embodiments, the capsule can be provided not as a single file, but as a collection of files.

In the second method of capsule creation, the capsule is first created for a particular application with only the system files and the CR software, and then the application is installed within the capsule environment so that the installation process is managed by the CR filters, i.e. the CR filters track the installation process which is then treated as a process that is associated with the capsule; as a result, all the objects, e.g. files created on the computer platform during and as the result of the installation will be automatically placed within the capsule object set.

Finally, the encapsulated application is deployed by docking the capsule on the one or more computer platforms, as defined by activation details. The procedure to dock a capsule includes 1) validation that the capsule can be hosted, as defined by activation details, and 2) placing the files from the single capsule file into the appropriate locations so that they can be delivered to the application(s) within the capsule environment; this step finalizes the creation of the capsule-related object namespace. Any errors detected by applications within the capsule environment will cause capsule state to transition from available to error. User interfaces, local and remote, support management and audit of a docked capsule.

Figure 11:
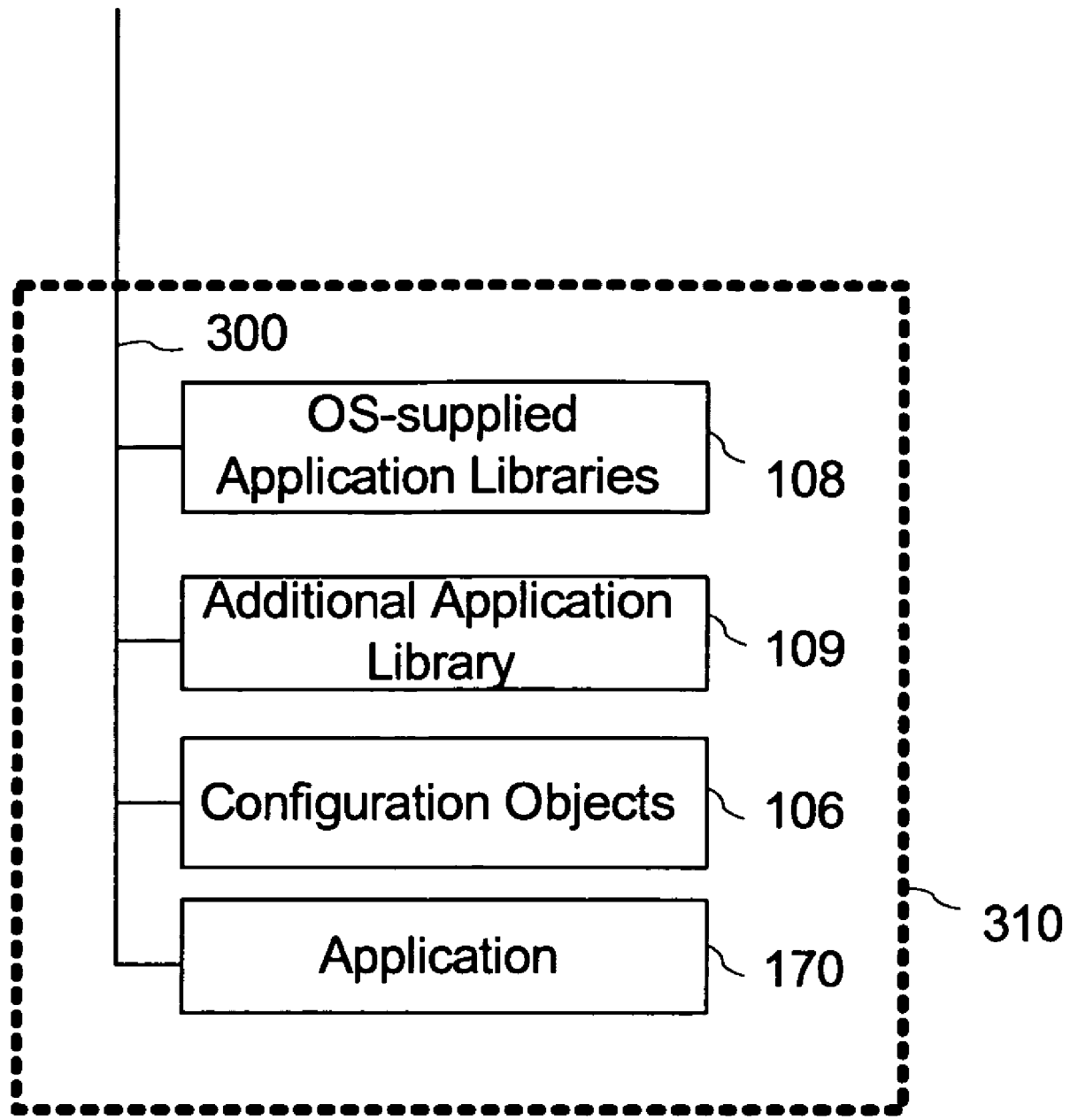
FIG. 11 is a block diagram schematically representing the capsule object set.

FIG. 11 schematically represents the capsule object namespace 310 of an application capsule, showing the capsule object set formed by the application libraries 108 including replicas of OS-supplied system objects, the additional application library 109 providing the high-level system service filters, also referred to herein as application filters, configuration objects 106, and the application objects 170 including the application executable. The shown capsule object set is organized in a directory structure 300 that provides the capsule object namespace 310 when supported by the system service filters provided by the additional application library 109 as described hereinabove in this specification.

Those skilled in the art will appreciate that the invention may be practiced with a plurality of computer system configurations, including personal computers, hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

Other embodiments of the invention are possible as would be obvious to those skilled in the art from the present description.

Appendix I
Files Required by Firefox

By way of example, the following is a list of application files and OS-supplied system files required to support a Mozilla Firefox® browser on Linux OS, which form the application file set and capsule application library for a Firefox application capsule according to an embodiment of this invention within a capsule directory /export/capsules/FirefoxCapsule/:

/bin (17 files)
a. awk
b. basename
c. bash
d. cut
e. domainname
f. gawk
g. grep
h. hostname
i. ls
j. mount
k. rm
l. sed
m. sh
n. sleep
o. sort
p. sync
q. uname
/etc (17 files)
a. bashrc
b. fonts
c. fstab
d. gnome-vfs-2.0
e. gtk-2.0
f. hosts
g. initlog.conf
h. ld.so.cache
i. localtime
j. mtab
k. nsswitch.conf
l. pango
m. rc.d
n. resolv.conf
o. rpc
p. ssh
q. sysconfig
/lib (23 files)
a. ld-2.3.2.so
b. ld-linux.so.2
c. libcrypto.so.0.9.7a
d. libcrypto.so.4
e. libdl-2.3.2.so
f. libdl.so.2
g. libgcc_s-3.2.2-20030225.so.1
h. libgcc_s.so.1
i. libnsl-2.3.2.so
j. libnsl.so.1
k. libnss_files-2.3.2.so
l. libnss_files.so.2
m. libpcre.so.0
n. libpcre.so.0.0.1
o. libproc.so.2.0.11
p. libresolv-2.3.2.so
q. libresolv.so.2
r. librt-2.3.2.so
s. librt.so.1
t. libssl.so.0.9.7a
u. libssl.so.4
v. libtermcap.so.2
w. libtermcap.so.2.0.8
x. tls
/sbin (8 files)
a. chkconfig
b. ifconfig
c. initlog
d. insmod
e. killall5
f. lsmod
g. pidof
h. sysctl
/usr (7 subdirs)
a. bin
　i. dirname
　ii. id
　iii. pgrep
　iv. tr
　v. which
b. kerberos/lib
　i. libcom_err.so.3
　ii. libcom_err.so.3.0
　iii. libgssapi_krb5.so.2
　iv. libgssapi_krb5.so.2.2
　v. libk5crypto.so.3
　vi. libk5crypto.so.3.0
　vii. libkrb5.so.3
　viii. libkrb5.so.3.1
c. lib
　i. gconv
　ii. gtk-2.0
　iii. libatk-1.0.so.0
　iv. libatk-1.0.so.0.200.0
　v. libaudiofile.so.0
　vi. libaudiofile.so.0.0.2
　vii. libbonobo-2.so.0
　viii. libbonobo-2.so.0.0.0
　ix. libbonobo-activation.so.4
　x. libbonobo-activation.so.4.0.0
　xi. libesd.so.0
　xii. libesd.so.0.2.28
　xiii. libexpat.so.0
　xiv. libexpat.so.0.4.0
　xv. libfontconfig.so.1
　xvi. libfontconfig.so.1.0
　xvii. libfreetype.so.6
　xviii. libfreetype.so.6.3.2
　xix. libgconf-2.so.4
　xx. libgconf-2.so.4.1.0
　xxi. libgdk_pixbuf-2.0.so.0
　xxii. libgdk_pixbuf-2.0.so.0.200.1
　xxiii. libgdk-x11-2.0.so.0
　xxiv. libgdk-x11-2.0.so.0.200.1
　xxv. libglib-2.0.so.0
　xxvi. libglib-2.0.so.0.200.1
　xxvii. libgmodule-2.0.so.0
　xxviii. libgmodule-2.0.so.0.200.1
　xxix. libgnome-2.so.0
　xxx. libgnome-2.so.0.200.0
　xxxi. libgnomevfs-2.so.0
　xxxii. libgnomevfs-2.so.0.0.0
　xxxiii. libgobject-2.0.so.0 xxxiv. libgobject-2.0.so.0.200.1
xxxv. libgthread-2.0.so.0
xxxvi. libgthread-2.0.so.0.200.1
xxxvii. libgtk-xl 1-2.0.so.0
xxxviii. libgtk-xl 1-2.0.so.0.0.200.1
xxxix. liblinc.so.1
xl. liblinc.so.1.0.0
xli. libORBit-2.so.0
xlii. libORBit-2.so.0.0.0
xliii. libORBitCosNaming-2.so.0
xliv. libORBitCosNaming-2.so.0.0.0
xlv. libpango-1.0.so.0
xlvi. libpango-1.0.so.0.200.1
xlvii. libpangox-1.0.so.0
xlviii. libpangox-1.0.so.0.200.1
xlix. libpangoxft-1.0.so.0
l. libpangoxft-1.0.so.0.200.1
li. libpopt.so.0
lii. libpopt.so.0.0.0
liii. libstdc++.so.5
liv. libstdc++.so.5.0.3
lv. libxml2.so.2
lvi. libxml2.so.2.5.4
lvii. libz.so.1
lviii. libz.so.1.1.4
lix. locale
lx. pango
d. local/firefox
i. browserconfig.properties
ii. chrome
iii. components
iv. defaults
v. extensions
vi. firefox
vii. firefox-bin
viii. greprefs
ix. icons
x. install.log
xi. libmozjs.so
xii. libnspr4.so
xiii. libnss3.so
xiv. libnssckbi.so
xv. libplc4.so
xvi. libplds4.so
xvii. libsmime3.so
xviii. libsoftokn3.chk
xix. libsoftokn3.so
xx. libssl3.so
xxi. libxpcom_compat.so
xxii. libxpcom_core.so
xxiii libxpcom.so
xxiv. libxpistub.so
xxv. mozilla-xremote-client
xxvi. plugins
xxvii. readme.txt
xxviii. removed-files
xxix. res
xxx. run-mozilla.sh
xxxi. searchplugins
xxxii. updater
xxxiii. updater.ini
xxxiv. updates
xxxv. xpicleanup
e. sbin
i. exportfs
ii. rpcinfo f. share
i. fonts
ii. icons
iii. locale
iv. themes
g. X11R6
i. libICE.so.6
ii. libICE.so.6.3
iii. libSM.so.6
iv. libSM.so.6.0
v. libX11.so.6
vi. libX11.so.6.2
vii. libXcursor.so.1
viii. libXcursor.so.1.0
ix. libXext.so.6
x. libXext.so.6.4
xi. libXft.so.2
xii. libXft.so.2.1
xiii. libXi.so.6
xiv. libXi.so.6.0
xv. libXrandr.so.2
xvi. libXrandr.so.2.0
xvii. libXrender.so.1
xviii. libXrender.so.1.2
xix. libXt.so.6
xx. libXt.so.6.0
h. X11
i. fonts
ii. locale
/var/lib/nfs/etab

What is claimed is:

1. In a computer platform for executing a first software application and second software applications, wherein the computer platform includes a processor, an operating system (OS) including a kernel residing on the computer platform, and a set of associated system objects included within an OS-defined system object namespace, a method for isolating effects of malware within a contained capsule environment when said malware is loaded via the first software application onto the computer platform, the method comprising the steps of:

a) providing within the contained capsule environment a capsule object namespace that is distinct from the OS-defined system object namespace and accessible by the first software application and processes originated therefrom;

b) providing a capsule object set in the application-specific capsule object namespace, the capsule object set including:

i. a set of associated capsule-related system objects for use by the first software application and any process originated therefrom in place of at least some of the associated system objects that are resident on the computer platform as part of the OS and are required for execution of the first software application, wherein said set of associated capsule-related system objects is not for use by the second software applications; and, ii. capsule runtime software for managing a dynamic state and file location of the first software application, the capsule runtime software including at least one additional application library resident in user mode;

c) providing a kernel module for supporting the capsule runtime software in kernel mode;

wherein in operation the first software application and the second software applications utilize services of the same OS kernel residing on the computer platform; and, wherein the capsule runtime software provides system-service filters for dynamically filtering system service requests generated by the first software application or by a process originated therefrom for one or more application related system objects required by the first software application, and providing in response to said requests one or more corresponding application related system objects from the set of associated capsule-related system objects from the protected capsule-related object namespace, so as to contain malware-related system object changes and objects created by the first application, or any process originated therefrom, within the protected capsule-related object namespace, and to prevent the malware from changing system objects of the operating system.

2. A method according to claim 1, wherein the capsule run-time software is for managing configuration requests generated by the first software application and any process originated therefrom.

3. A method according to claim 2, wherein:

the OS includes an OS configuration object containing configuration values for defining software configuration of the computing platform; and, the set of associated capsule-related system objects comprises a capsule configuration object containing capsule-specific configuration values related to the first application, said capsule related configuration object being specific for the contained capsule environment;

and wherein the system-service filters provided by the capsule run-time software are for re-directing configuration requests generated by the first software application and by any process originated therefrom from the OS configuration object to the capsule configuration object, for preventing the malware from changing the configuration values of the OS configuration object.

4. A method according to claim 3, wherein the OS configuration object is an OS registry.

5. A method according to claim 4, wherein the system service filters provided by the capsule run-time software include an embedded database for managing registry requests.

6. A method according to claim 1, wherein in operation the system service filters, in response to a request by the first application or any process originated therefrom to modify an object located outside of the capsule object namespace, perform the steps of:

copying said object or at least a component thereof into the capsule object namespace to form a replica object in the capsule object namespace, and, modifying the replica object in accordance with the request, thereby preventing the malware from modifying the object located outside of the capsule object namespace.

7. A method of claim 1, wherein step (b) further includes the step of providing the first software application within the capsule object namespace, including providing one or more application objects including the first software application to the capsule object set.

8. A method of claim 7, further comprising the steps of:

d) executing the first application within the contained capsule environment, and e) at least partially replacing the capsule for removing the malware-related system object changes contained within the contained capsule environment from the computer platform.

9. A method of claim 8, wherein the step (e) comprises providing a new instance of the capsule including a default capsule object set known to be unaffected by malware, so that to restore the first software application within the new instance of the capsule.

10. A method of claim 9, wherein step (d) includes updating a user data object by the first application, and step (e) includes preserving the user data object for use by the first software application restored within the new instance of the capsule.

11. A method of claim 8, wherein step (e) comprises replacing at least a sub-set of the capsule objects set that may have been affected by the malware with a corresponding sub-set of objects known to be not affected by the malware for restoring the first software application within the contained capsule environment on the computer platform without malware in a state unaffected by the malware.

12. A method of claim 8, wherein step (e) is performed if malware associated with the first software application is deemed to be present on the computer platform.

13. A method of claim 8, wherein step (e) is performed without first evaluating if the malware is present on the computer platform.

14. A method of claim 8, wherein step (e) is performed at pre-determined intervals or events.

15. A method of claim 1, wherein the first software application is for accessing a network.

16. A method of claim 15, wherein the network comprises the internet.

17. A method of claim 1, wherein the first software application is one of: an internet browser, an email client, and an instant messenger client.

18. A method of claim 1, wherein the OS is one of a version of Microsoft Windows, a Unix-based OS, and a MAC OS X.

19. A method of claim 1, wherein the computer platform is a computer server, personal computer, personal workstation or a wireless hand-held device.

20. In a computer platform for executing a first software application and a plurality of second software applications, wherein the computer platform includes a processor, an operating system (OS) including a kernel residing on the computer platform, and a set of associated system objects included within an OS-defined system object namespace, and wherein each of said first and second software applications includes an object executable by an operating system for performing a task related to a service, a system for isolating the OS and the second applications from malware and malware-related changes, said malware loaded via the first software application onto the computer platform, the system comprising:

an application capsule for executing the first application therein, the application capsule having a capsule object namespace distinct from the OS-defined system object namespace and accessible by the first software application and processes originated therefrom and not by the second applications, the application capsule comprising:

a capsule object set comprising application objects associated with and including the first software application, and a set of capsule-related system objects required for execution of the first software application within the capsule environment, wherein in operation said capsule-related system objects are used by the first software application and any process originated therefrom in place of at least some of the associated system objects that are resident on the computer platform as part of the operating system, and are not for use by the second software applications;

capsule runtime software for managing a dynamic state and file locations of the first software application, the capsule runtime software including at least one application filter library accessible by the first application; and, a kernel module external to the capsule for supporting the capsule runtime software in kernel mode;

wherein in operation the first software application and the second software applications utilize services of the OS kernel residing on the computer platform; and, wherein the capsule runtime software provides system-service filters for dynamically filtering system service requests generated by the first software application or by a process originated therefrom for one or more associated system objects required by the first software application from the OS-defined object namespace, and providing in response to said requests one or more corresponding application related system objects from the set of capsule-related system objects from the capsule-related object namespace, so as to contain malware-related system object changes and objects created by the first application or any process originated therefrom within the capsule object namespace, and to prevent the malware from changing system objects of the operating system and objects associated with the second applications.

* * * * *